US012723689B2

(12) United States Patent
Cao et al.

(10) Patent No.: US 12,723,689 B2
(45) Date of Patent: Sep. 1, 2026

(54) SNAP-LOCKING CONNECTOR

(71) Applicant: Sulian (Chongqing) Intelligent Control Technology Co., Ltd., Chongqing (CN)

(72) Inventors: Shulin Cao, Chongqing (CN); Ming Xu, Chongqing (CN); Xuyang Li, Chongqing (CN); Taiming Shen, Chongqing (CN); Chuan Zhang, Chongqing (CN); Zongjun Han, Chongqing (CN); Ming Zhang, Chongqing (CN); Bo Liu, Chongqing (CN); Linjie Tian, Chongqing (CN); Qingyang Pu, Chongqing (CN); Yuqian Jiang, Chongqing (CN)

(73) Assignee: Sulian (Chongqing) Intelligent Control Technology Co., Ltd., Chongqing (CN)

( * ) Notice: Subject to any disclaimer, the term of this patent is extended or adjusted under 35 U.S.C. 154(b) by 0 days.

(21) Appl. No.: 19/190,879

(22) Filed: Apr. 28, 2025

(65) Prior Publication Data

US 2026/0104120 A1 Apr. 16, 2026

(30) Foreign Application Priority Data

Oct. 14, 2024 (CN) ........................ 202411430983.2
Apr. 9, 2025 (CN) ........................ 202520663398.0

(51) Int. Cl.
*F16L 37/098* (2006.01)

(52) U.S. Cl.
CPC ....... *F16L 37/0982* (2013.01); *F16L 2201/60* (2013.01)

(58) Field of Classification Search
CPC ... F16L 37/0982; F16L 37/0841; F16L 37/12; F16L 37/123; F16L 37/138
See application file for complete search history.

(56) References Cited

U.S. PATENT DOCUMENTS 10,350,401 B2 * 7/2019 Ciccone .................. F16L 37/08
2017/0211738 A1 * 7/2017 Tiberghien ............. F16L 37/34

FOREIGN PATENT DOCUMENTS

CN 108591654 A 9/2018
CN 110608325 A 12/2019

(Continued)

OTHER PUBLICATIONS

Author: Mark Sprenger, Intel Corporation, title of the article: Open Compute Project Universal Quick Disconnect (UQD) Specification Revision 1.0, Sep. 4, 2020.

(Continued)

*Primary Examiner* — Aaron M Dunwoody

(57) ABSTRACT

The present invention discloses a snap-locking connector, which includes a locking block, a connecting sleeve, an upper housing assembly, a locking snap ring, and a lower housing assembly. An upper valve core is elastically arranged in the upper housing assembly, with a first sealing ring provided on the upper valve core. A push rod and a lower valve core are provided in the lower housing assembly, with the lower valve core sleeved on the outer side wall of one side of the push rod, and a second sealing ring arranged on the push rod. In this invention, the upper housing assembly compresses the lower housing assembly and the push rod abuts against the upper valve core. The locking block snaps into the upper housing assembly for position fixation, and the locking snap ring further secures the locking block. This design ensures a sealed connection between the upper and lower housing assemblies, with the push rod tightly abutting the upper valve core without any gap, while also preventing the locking block from unintentionally unlocking. For disassembly, the locking snap ring is loosened, the locking block is moved, and the upper housing assembly automatically pops out. At the same time, the (Continued)

sealing rings seal the connected area, achieving leak-free disassembly.

15 Claims, 12 Drawing Sheets

(56) References Cited

FOREIGN PATENT DOCUMENTS

| | | | |
|---|---|---|---|
| CN | 113483179 | A | 10/2021 |
| CN | 114135729 | A | 3/2022 |
| CN | 114593297 | A | 6/2022 |
| CN | 117781058 | A | 3/2024 |
| CN | 221683908 | U | 9/2024 |
| CN | 223105596 | A | 7/2025 |
| TW | M659636 | U | 8/2024 |

OTHER PUBLICATIONS

China Green Data Center Technology Innovation Forum Release, Innovative Practicesin Green Data Centers Design Reference for Liquid Cooling System of Cold Plate.

Open Data Center Committee Released in Sep. 2023, White Paper on Design of Liquid-Cooled Server With Cold Plate, [Reference No. ODCC-2023-01008].

Open Data Center Committee Released in Sep. 2023, White Paper on Standardization and Technical Optimization of Liquid Cooling for Cold Plates, [Reference No. ODCC-2023-02004].

Open Data Center Committee Released in Sep. 2023, Reliability Test Specification for Cold Plate Liquid-Cooled Servers, [Reference No. ODCC-2023-05007].

Open Data Center Standards Promotion Committee Released in Sep. 2024, Technical Requirements and Testing Methods for Non-Water-Cooled Plate-Type Liquid Cooling Systems in Data Centers, [Reference No. ODCC-2024-02006].

Open Computing Standards Working Committee releases, Liquid Cooling Design for Artificial Intelligence Acceleration Card Based on Standard PCIe Interface White Paper (Jan. 2024) , OCTC BA01—2024.

China Thailand Laboratory China Academy of Information and Communications Technology, Detection Report, Report No. 24B01Y000112-001.

* cited by examiner

SNAP-LOCKING CONNECTOR

CROSS-REFERENCE TO RELATED APPLICATIONS

This application claims priority benefits to Chinese Patent Application No. 2024114309832 and No. 2025206633980, filed on Oct. 14, 2024 and Apr. 19, 2025, the contents of which are incorporated herein by reference.

TECHNICAL FIELD

The present invention relates to the technical field of cooling pipeline fittings for equipment, and more particularly to a snap-locking connector.

BACKGROUND

At present, quick-connect devices composed of a male plug and a female socket are widely used in liquid cooling pipelines for data centers. In actual use, after the male plug and the female socket are connected, there is a risk that the locking mechanism may accidentally disengage due to misoperation, external vibration, or pulse pressure. This can result in accidental disconnection of the pipeline, leading to inadequate cooling of heat-generating components, which in turn may cause performance degradation, damage, or even spontaneous combustion.

SUMMARY OF THE INVENTION

To address the shortcomings of the existing technology, the technical problem to be solved by the present invention is to provide a snap-locking connector that ensures stable locking, prevents unintentional disengagement, and allows for disassembly without medium leakage.

To solve the above technical problem, the present invention adopts the following technical solution: A snap-locking connector is provided, comprising a connecting sleeve movably equipped with a locking block, an upper housing assembly that is snap-fitted with the locking block, a locking snap ring that is adjustably sleeved on the outer side of the connecting sleeve and abuts the locking block to provide positional restriction, and a lower housing assembly detachably connected to the connecting sleeve. An upper valve core is elastically arranged within the upper housing assembly, and is capable of reciprocating along its axial direction. After movement, the upper valve core can automatically return to its original position via elastic force. A first sealing ring is provided on the upper valve core, allowing the upper valve core to form a sliding seal with the upper housing assembly. The lower housing assembly contains a push rod and an elastically mounted lower valve core, which is also capable of reciprocating along its axial direction and can automatically return to its original position via elastic force after movement. The lower valve core is sleeved on the outer side wall of one end of the push rod. A second sealing ring is arranged at the corresponding sleeving position on the push rod, enabling the lower valve core to form a sliding seal with the lower housing assembly through the second sealing ring. During use, the upper housing assembly presses against the lower valve core, causing relative displacement between the lower valve core and the push rod and pushing the upper valve core outward. This establishes communication between the upper and lower housing assemblies. The locking block snaps into and restricts the upper housing assembly, and the locking snap ring is adjusted along the outer side of the connecting sleeve to abut and restrict the locking block, thus securing it in place. For disassembly, the locking snap ring is adjusted and removed, releasing the restriction on the locking block. The locking block is then pressed to release its snap engagement, and the upper housing assembly is no longer restricted. Under the action of elastic force, the upper valve core is pushed back by the push rod, and the lower valve core resets. The liquid outlet end of the upper housing assembly seals against the first sealing ring, and the second sealing ring seals against the liquid outlet end of the lower housing assembly.

With the above structure, the upper housing assembly presses the lower valve core, causing the push rod to push the upper valve core upward and enabling the upper and lower housing assemblies to establish fluid communication. The locking block engages and restricts the upper housing assembly, while the locking snap ring is pushed into position on the connecting sleeve and abuts the locking block, eliminating any clearance in the locking block's movement and simultaneously limiting its own rotation. This effectively prevents the locking block from unintentionally disengaging under external force. During disassembly, the locking snap ring is first released, followed by disengagement of the locking block. The upper housing assembly is no longer constrained and, under the action of elastic force, the upper valve core is pushed back by the push rod. Throughout this process, the upper valve core and the push rod remain in contact, and a sliding seal is maintained between the upper valve core and the upper housing assembly, ensuring that there is no residual medium leakage. At the same time, the outlet end of the upper housing assembly is sealed against the upper valve core by the first sealing ring, and the push rod is sealed against the outlet end of the lower housing assembly via the second sealing ring. In other words, the upper and lower housing assemblies can be separated by pressing a release button. When the upper housing assembly is pulled out from the connecting sleeve, no fluid leaks occur. The overall structure is compact and simple, and operation is convenient.

To further simplify the structure and facilitate installation, a preferred configuration provides that one side of the connecting sleeve is equipped with a connecting boss, while the opposite side is equipped with a fixed boss that abuts the locking snap ring. Both the connecting boss and the fixed boss are integrally formed with the connecting sleeve. A through hole is provided in the connecting boss and communicates with the interior of the connecting sleeve. The locking block is positioned within this through hole. An open slot is formed in the connecting boss at a position corresponding to the locking block, with the slot penetrating through the side of the boss to allow horizontal movement of the locking block along the boss, thus enabling horizontal displacement of the locking block. At the lower end of the open slot opening, a positioning groove is provided. The locking block is provided with a clearance hole that communicates with the through hole. One side of the opening of the clearance hole is formed with a clearance slope, which extends upward from the hole wall of the clearance hole toward the outer circular surface of the connecting boss. As a result, the opening on the end of the clearance hole near the push rod is smaller than the other end, and the slope of the clearance slope is angled relative to the movement direction of the locking block. This allows the locking block to be pushed during the insertion of the upper housing assembly into the lower housing assembly. An extension section is formed on one side of the locking block and protrudes outward from the connecting boss, extending toward the lower housing assembly and positioned on the outer side of the connecting sleeve. Two positioning lugs are symmetrically arranged on the inner wall of the extension section. A first placement groove is formed between the two positioning lugs, within which a first guide post is disposed. A return spring is sleeved over the outside of the guide post. One end of the return spring abuts against the bottom of the first placement groove, while the other end extends outward to abut against a corresponding position on the connecting sleeve.

To facilitate the limiting and positioning of the locking snap ring during movement, and as a preferred solution, a positioning protrusion is provided on a section of the locking snap ring (locking snap sleeve) at a position corresponding to the positioning groove. An open through-slot is formed on the opposite side of the locking snap ring, making it an open sleeve. At the opening ends of the through-slot, and at positions corresponding to the positioning lugs, stop protrusions are respectively provided. The inner side walls of each stop protrusion are vertically provided with “V”-shaped through-slots that penetrate the inner side wall of the locking snap ring. The two “V”-shaped through-slots are located on the inner wall of the locking snap ring and are positioned on both sides of the open through-slot. The outer side walls of the corresponding stop protrusions are tightly fitted against the outer side walls of the positioning lugs, allowing the stop protrusions to be inserted between the positioning lugs and the outer wall of the connecting sleeve, thereby preventing the extension section from being pressed and realizing the locking of the locking block. An opening is further formed on the outer side wall of the locking snap ring, within which a tab is integrally connected. Between the left and right ends of the tab and the wall of the opening, first strip grooves are formed. A second strip groove is formed between the free end of the tab (non-connected end) and the wall of the opening. The two ends of the second strip groove are connected with the two first strip grooves respectively. A limiting bump is provided on the inner side wall of the tab. A first protrusion is formed on the outer wall of the connecting sleeve, in close contact with the inner wall of the locking snap ring. A second protrusion is formed at a position corresponding to the second strip groove. When the stop protrusions of the locking snap ring are not inserted between the positioning lugs and the outer wall of the connecting sleeve, the lower end surface of the second protrusion abuts against the upper end surface of the limiting bump. At positions on the connecting sleeve corresponding to the stop protrusions, third protrusions are provided. These third protrusions extend into the “V”-shaped through-slots for limiting, with multiple third protrusions respectively inserted into the two “V”-shaped through-slots to prevent the locking snap ring from rotating or shifting on the connecting sleeve.

To simplify the connection with the return spring, and as a preferred solution, a second placement groove is formed on the outer wall of the connecting sleeve at a position corresponding to the open through-slot. A second guide post is provided within the second placement groove. The extended end of the return spring is sleeved on the outer side of the second guide post and abuts against the bottom of the second placement groove.

To enhance connection stability while ensuring synchronized unlocking and sealing by the first sealing ring, and as a preferred solution, the upper housing assembly includes a male plug sleeve. A placement hole is axially formed through the male plug sleeve. An orientation boss is formed on one end of the outer side of the male plug sleeve, and a limiting boss is provided at the other end. The side of the limiting boss near the insertion end of the male plug sleeve has a conical surface, with the diameter gradually decreasing toward the insertion end. During insertion of the male plug sleeve into the connecting sleeve, this conical surface cooperates with the clearance slope to drive the locking block to move. Meanwhile, a limiting groove is provided between the orientation boss and the limiting boss on the male plug sleeve, and the width of the limiting groove is greater than the thickness of the locking block. A first compression spring is disposed inside the placement hole, and a retaining ring is installed at the end of the placement hole farthest from the connecting sleeve. One end of the first compression spring is fixed to the retaining ring secured inside the placement hole, and the other end is fixed to the upper valve core. A first sealing ring is embedded on the outer side of the upper valve core, and the first sealing ring closely abuts the wall of the placement hole. During installation, the male plug sleeve is inserted into the connecting sleeve and passes through the locking block via the clearance hole. The upper end surface of the limiting boss abuts the lower end surface of the locking block to achieve locking and positioning of the male plug sleeve by the locking block.

To facilitate the positioning of the upper valve core and prevent the first sealing ring from being exposed and thereby affecting the sealing performance, and as a preferred solution, a transition slope is formed around the outer wall of the upper valve core. The transition slopes are arranged in multiple segments, spaced circumferentially around the upper valve core. At corresponding positions on the inner wall of the placement hole, limiting slopes are provided to match the transition slopes. These limiting slopes are in close contact with the transition slopes, and the end face of the non-connection end of the upper valve core is flush with the end face of the corresponding opening of the placement hole.

To ensure synchronization between unlocking and the sealing function of the second sealing ring, and as a preferred solution, the lower housing assembly further includes a female plug sleeve, which is threadedly connected to the connecting sleeve. A stepped hole is formed within the connecting sleeve. A push rod is fixed inside the female plug sleeve, extending into the small-diameter end of the stepped hole. The inserted end of the push rod is inserted into the orientation hole of the lower valve core. An installation groove is provided in the female plug sleeve at the position corresponding to the point where it communicates with the connecting sleeve. One end of the push rod is connected to an installation ring, which is sleeved and fixed within the installation groove. The connecting sleeve and the female plug sleeve are connected via the installation ring. A second compression spring is sleeved around the outer side of the push rod. A connecting lug is formed circumferentially on one side of the lower valve core, in the shape of an annular ring on the outer wall of the lower valve core. One end of the second compression spring is sleeved onto the lower valve core and abuts the lower end surface of the connecting lug, while the other end abuts the inner wall of the installation ring. The second sealing ring is embedded on the outer wall of the inserted end of the push rod and fits tightly against the inner wall of the orientation hole.

To facilitate the positioning of the lower valve core and prevent the second sealing ring from being exposed and thereby affecting the sealing performance, and as a preferred solution, a transition hole is provided between the through hole and the stepped hole to ensure communication. A sleeve is sleeved around the outside of the second compression spring and extends into the larger-diameter end of the stepped hole. From top to bottom, between the end face of the inserted end of the sleeve and the bottom of the stepped hole, an upper sealing ring, an isolation ring, and a lower sealing ring are sequentially stacked. The upper end face of the upper sealing ring abuts the bottom of the stepped hole, while the lower end face of the lower sealing ring abuts the end face of the inserted end of the sleeve. When the second compression spring is not compressed, both the lower sealing ring and the isolation ring are sleeved around the outer side of the lower valve core, and the outer end face of the sleeve abuts the inner wall of the installation ring.

To facilitate positioning of the sleeve and simplify the structure, and as a preferred solution, the step surface of the stepped hole is configured as an inclined surface that is narrower at the top and wider at the bottom. A first positioning slope is provided on the outer wall of the sleeve at a position corresponding to the step surface of the stepped hole. A second positioning slope is formed on the inner wall of the sleeve at a position corresponding to the first positioning slope, causing the opening at the end of the sleeve near the connecting boss to narrow. During installation, the sleeve is inserted into the stepped hole, with the end face of the inserted end of the sleeve abutting the lower end face of the lower sealing ring. The first positioning slope fits closely against the step surface of the stepped hole, and the second positioning slope fits closely against the upper end surface of the connecting lug.

To avoid interference during the movement of the locking snap ring, and as a preferred solution, beveled sections are provided on both the second protrusion and the limiting bump to allow clearance for the movement of the locking snap ring.

In the present invention, the locking structure of the locking block may also be implemented as follows:

The locking snap ring is configured as a sleeve structure and is rotatably mounted on the connecting sleeve, while being axially immovable. A stop protrusion is provided on the outer wall of the locking snap ring, which can be tightly pressed between the extension section and the locking snap ring.

To prevent the locking snap ring from continuing to rotate or reversing after the stop protrusion has entered the space between the locking snap ring and the extension section, an anti-rotation structure is cooperatively arranged on both the locking snap ring and the connecting sleeve. This anti-rotation structure prevents the locking snap ring from rotating when the stop protrusion is tightly pressed between the extension section and the locking snap ring.

Specifically, to prevent the locking snap ring from continuing to rotate after the stop protrusion has entered the space between the locking snap ring and the extension section, the anti-rotation structure includes an elastic tab provided on the locking snap ring. The inner wall of the elastic tab is equipped with a protrusion, and the outer wall of the connecting sleeve is provided with a rib that matches the protrusion. To allow the protrusion on the elastic tab to smoothly pass over the rib, both the protrusion and the rib are strip-shaped, and their end faces are shaped as triangles or trapezoids.

To further prevent the locking snap ring from reversing after the stop protrusion enters the space between the locking snap ring and the extension section, the anti-rotation structure further includes a first boss provided on the locking snap ring and a second boss provided on the connecting sleeve. When the stop protrusion is tightly pressed between the extension section and the locking snap ring, the first boss abuts the second boss to prevent further rotation.

To facilitate the installation of the locking snap ring, the fixed boss on the connecting sleeve is eliminated. Instead, the connecting sleeve is configured as a stepped shaft, and the locking snap ring is sleeved onto the smaller-diameter end of the connecting sleeve. In this configuration, the lower housing assembly is still fixed to the smaller-diameter end of the connecting sleeve by threaded connection, or alternatively, it may be sleeved onto the smaller-diameter end and secured by welding.

To ensure that the stop protrusion can smoothly enter the space between the locking snap ring and the extension section, the inner wall of the extension section is provided with a second arc surface, and the stop protrusion is provided with a first arc surface that is adapted to the second arc surface.

To prevent the return spring from interfering with the rotation of the locking snap ring, an opening is also formed on the locking snap ring to accommodate the return spring.

For the convenience of operators in directly observing the rotation status of the locking snap ring, corresponding visual indicators are provided on both the extension section and the locking snap ring.

Beneficial Effects

In this invention, the upper housing assembly presses the lower housing assembly, and the push rod abuts the upper valve core. The locking block snaps onto and restricts the upper housing assembly, while the locking snap ring further restricts the locking block. This configuration enables the upper and lower housing assemblies to be connected and communicated, while also preventing the locking block from disengaging unintentionally. During disassembly, the locking snap ring is released and the locking block is moved, allowing the upper housing assembly to automatically pop out. Meanwhile, the sealing rings synchronously seal the communication points, thereby achieving leak-free disassembly.

BRIEF DESCRIPTION OF THE DRAWINGS

The drawings described herein are provided to further aid in understanding the present application and form a part of this application. The exemplary embodiments and their descriptions are intended for illustrative purposes only and should not be construed as limiting the scope of the present application. In the drawings.

Figure 1:
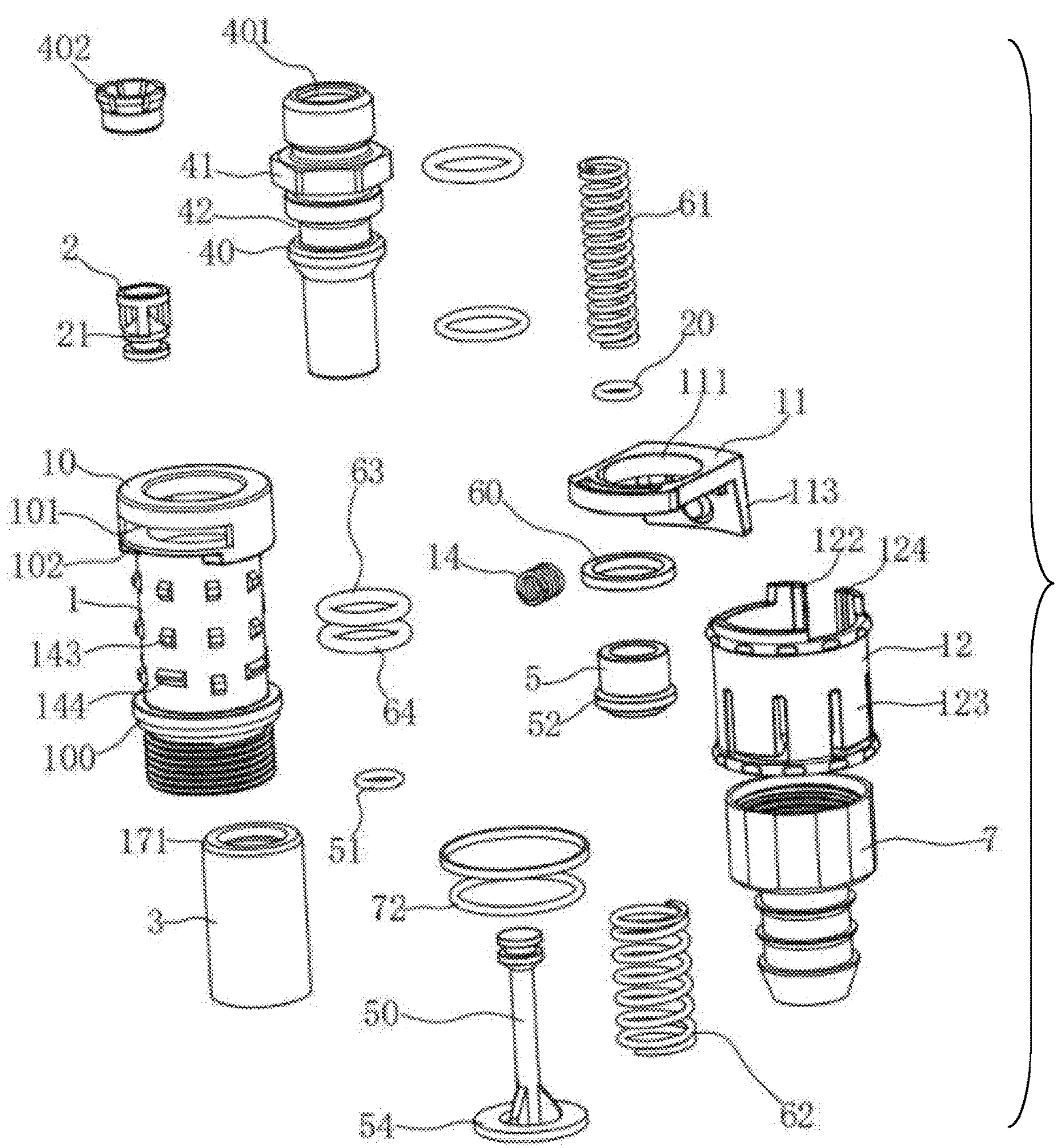
FIG. 1 is an exploded view of Embodiment 1.
Figure 2:
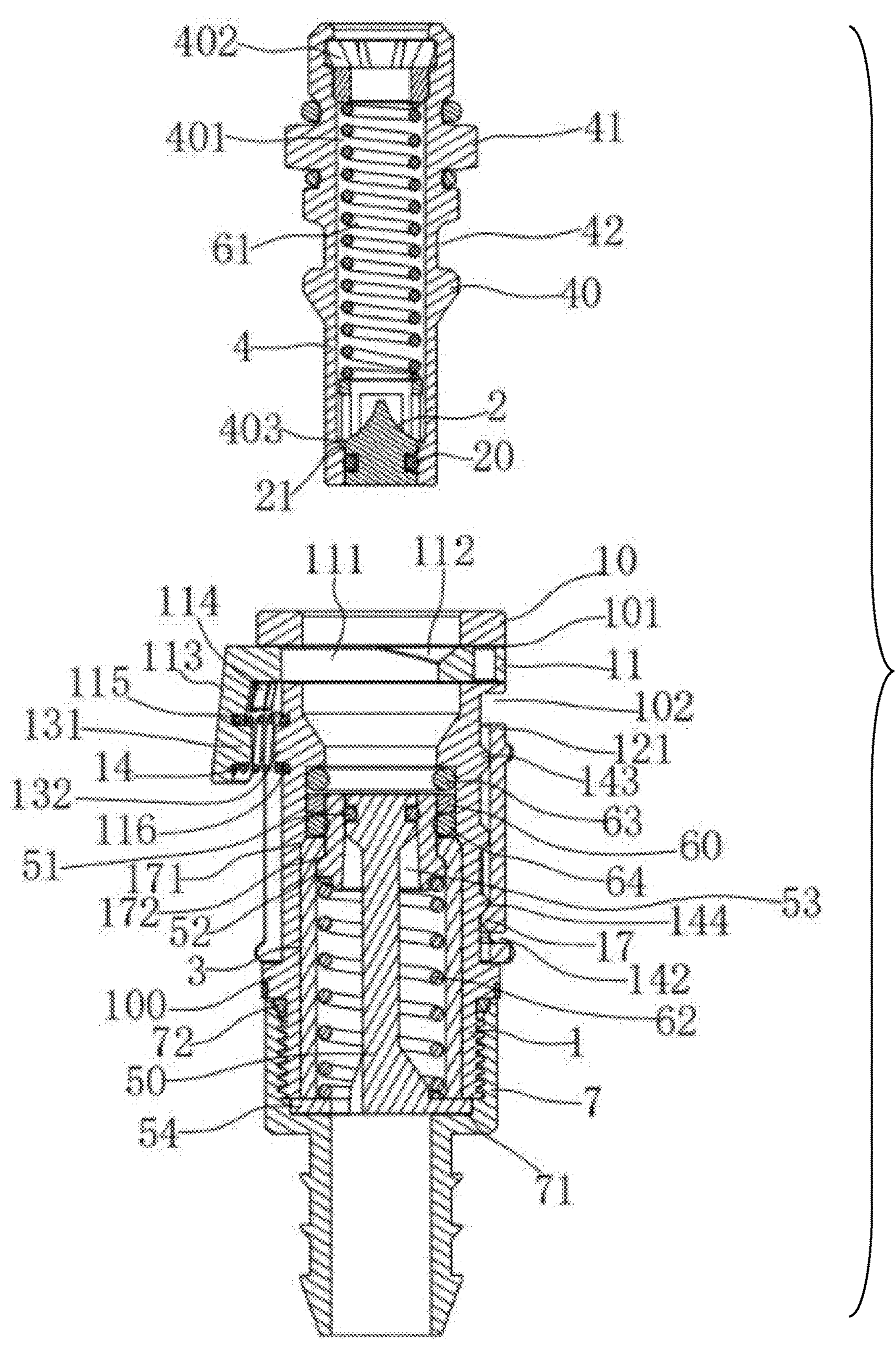
FIG. 2 is a schematic diagram of the assembly structure of Embodiment 1 before connection.
Figure 3:
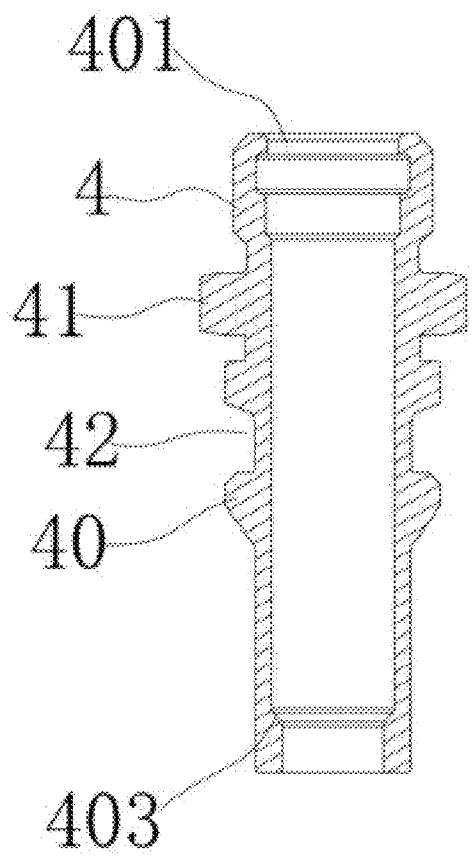
FIG. 3 is a schematic view of the structure of the male plug sleeve in Embodiment 1.
Figure 4:
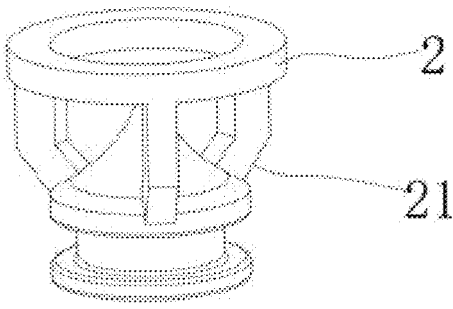
FIG. 4 is a schematic view of the structure of the upper valve core in Embodiment 1.
Figure 5:
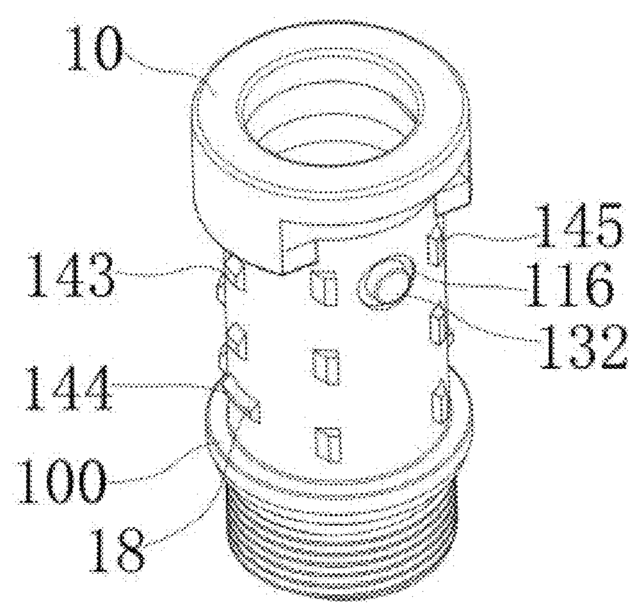
FIG. 5 is a schematic view of the mounting structure of the second guide post and the connecting sleeve in Embodiment 1.
Figure 6:
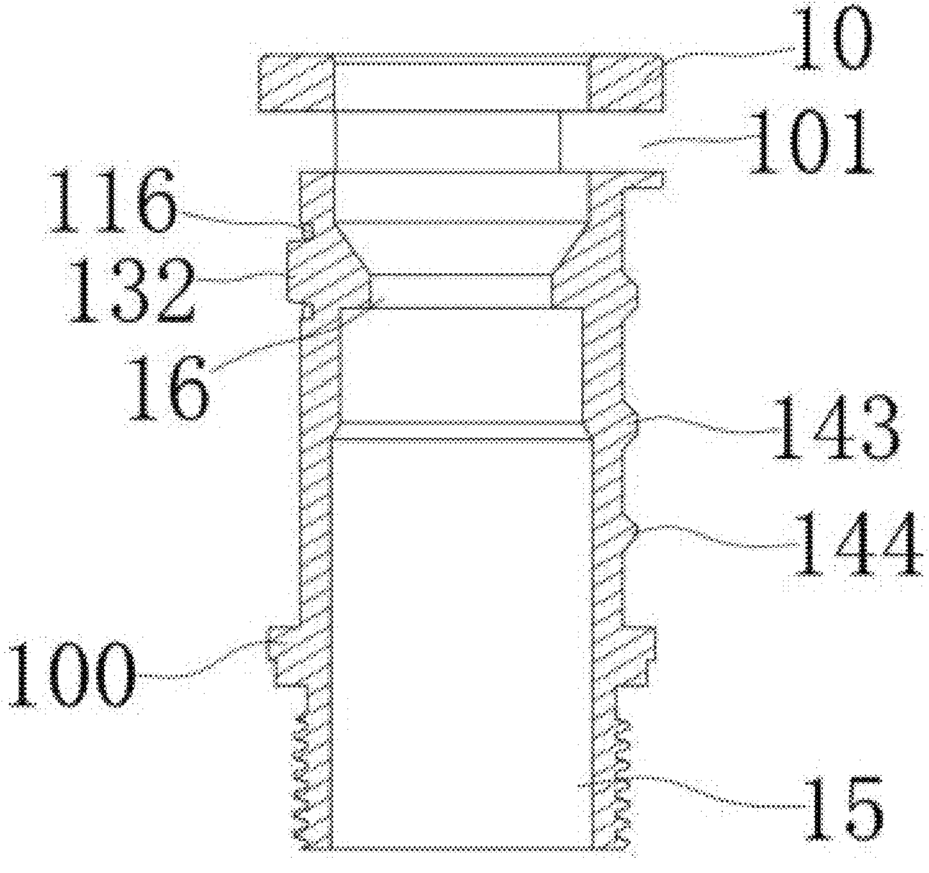
FIG. 6 is a schematic view of the internal structure of the connecting sleeve in Embodiment 1.

Reference numerals in the drawings are defined as follows:

Connecting sleeve—1;

Connecting boss—10; Fixed boss—100; Open slot—101; Positioning groove—102; Support protrusion—103; Locking block—11; Clearance hole—111; Clearance slope—112; Extension section—113; Positioning protrusion—114; First placement groove—115; Second placement groove—116; Anti-return protrusion—117;

Locking snap ring—12; Open through-slot—120; Positioning protrusion—121; Stop protrusion—122; Tab—123; V-shaped through-slot—124; First guide post—131; Second guide post—132; Return spring—14; First strip groove—141; Second strip groove—142; First protrusion—143; Second protrusion—144; Third protrusion—145; Stepped hole—15; Transition hole—16; Limiting bump—17; First positioning slope—171; Second positioning slope—172; Beveled section—18;

Upper valve core—2; First sealing ring—20; Transition slope—21;

Sleeve—3;

Male plug sleeve—4; Limiting boss—40; Placement hole—401; Retaining ring—402; Limiting slope—403; Orientation boss—41; Limiting groove—42;

Lower valve core—5; Push rod—50; Second sealing ring—51; Connecting lug—52; Orientation hole—53; Installation ring—54;

Isolation ring—60; First compression spring—61; Second compression spring—62; Upper sealing ring—63; Lower sealing ring—64;

Female plug sleeve—7; Installation groove—71; Third sealing ring—72;

Stop protrusion—120'; Elastic tab—121'; First boss—123'; First arc surface—124'; Opening—125'; Indicator mark—126';

Rib—100'; Second boss—101'; Second arc surface—102'.

DETAILED DESCRIPTION OF EMBODIMENTS

Embodiment 1

As shown in FIGS. 1 through 9, the present invention includes a connecting sleeve 1 movably provided with a locking block 11, an upper housing assembly that is snap-fitted with the locking block 11, a locking snap ring 12 that is adjustably sleeved on the outer side of the connecting sleeve 1 and abuts the locking block 11 to restrict its movement, and a lower housing assembly detachably connected to the connecting sleeve 1. The locking block 11 can move horizontally on the connecting sleeve 1, causing the center of the locking block 11 to shift relative to the center of the connecting sleeve 1. Since the connecting sleeve 1 and the upper housing assembly are arranged coaxially after insertion, a horizontal displacement of the locking block 11 causes its center to shift relative to the center of the upper housing assembly. This allows the locking block 11 to lock the inserted upper housing assembly in place. When unlocking is required, the locking block 11 returns to its original position, aligning its center coaxially with the upper housing assembly, thereby releasing the locking function and allowing the upper housing assembly to be easily separated from the connecting sleeve 1. The locking snap ring 12 serves to lock or release the locking block 11. In use, the upper and lower housing assemblies are respectively connected to the ports of two pipelines. The upper housing assembly is inserted into the connecting sleeve 1, thereby completing the connection between the two pipelines.

An upper valve core 2 is elastically arranged within the upper housing assembly. The upper valve core 2 is located at the inserted end of the upper housing assembly and is vertically movable within it. A first sealing ring 20 is provided on the upper valve core 2. The first sealing ring 20 is positioned on its outer circumferential surface of the upper valve core. This allows the upper valve core 2 to form a sealed fit with the upper housing assembly during vertical sliding motion and to seal the inserted end of the upper housing assembly when the upper valve core 2 remains stationary. The lower housing assembly contains a push rod 50 and an elastically mounted lower valve core 5, which has a sleeve structure and is located at the inserted end of the connecting sleeve 1. The lower valve core 5 is sleeved over the outer side wall of one end of the push rod 50 and mates with the inserted end of the upper housing assembly 4. When the upper housing assembly is inserted into the connecting sleeve 1, the push rod 50 drives the upper valve core 2, and the connecting sleeve 1 drives the lower valve core 5. A second sealing ring 51 is arranged at the corresponding sleeving position on the push rod 50, allowing the push rod 50 and the lower valve core 5 to form a sliding seal. During use, the upper housing assembly presses against the lower valve core 5, causing the lower valve core 5 to move toward the opposite end of the push rod 50, thereby disengaging the seal between the lower valve core 5 and the push rod 50. At the same time, the push rod 50 pushes the upper valve core 2 outward, driving it toward the opposite end of the upper housing assembly and breaking the seal between the upper valve core 2 and the upper housing assembly. This establishes a through-connection between the upper housing assembly and the connecting sleeve 1, and ultimately between the upper and lower housing assemblies. Next, the locking block 11 snaps into position on the upper housing assembly to provide axial retention, locking the upper housing assembly to the connecting sleeve 1. The locking snap ring 12 is then adjusted and slid along the outer surface of the connecting sleeve 1 to press against the locking block 11, securing it in place and preventing unintended displacement of the locking block 11. For disassembly, the locking snap ring 12 is first moved away, releasing its constraint on the locking block 11. The locking block 11 is then pressed to disengage it from its locking position, allowing the upper housing assembly to be unlocked from the connecting sleeve 1 and easily withdrawn. During this process, as the elastic force gradually overcomes the diminishing thrust from the push rod 50, the upper valve core 2 is pushed back to its original position by spring force, sealing the fluid outlet of the upper housing assembly via the first sealing ring 20. Simultaneously, the lower valve core 5 loses the axial force exerted by the upper housing assembly and returns to its initial position under spring force, reestablishing its sealing fit with the push rod 50. The second sealing ring 51 then seals against the fluid outlet end of the connecting sleeve 1.

Specifically, a connecting boss 10 is provided at the inserted end of the connecting sleeve 1, while a fixed boss 100 is formed at the opposite end for abutting and limiting the position of the locking snap ring 12. The fixed boss 100 is located on the outer circumferential surface of the connecting sleeve 1. A through hole is formed on the connecting boss 10 and communicates with the interior of the connecting sleeve 1; the diameter of the through hole matches the opening diameter of the connecting sleeve 1. The locking block 11 is installed within the through hole. At the position on the connecting boss 10 corresponding to the locking block 11, an open slot 101 is formed. The width of the open slot 101 is adapted to the width of the locking block 11, and the slot 101 extends through the side of the connecting boss 10, allowing the locking block 11 to move outward or inward through the open slot 101 relative to the connecting sleeve 1. As a result, the center of the locking block 11 can be adjusted relative to the center of the connecting sleeve 1. A positioning groove 102 is further formed at the lower end of the slot opening of open slot 101 on the side of the connecting boss 10 opposite the upper housing assembly. A clearance hole 111 is formed in the locking block 11, communicating with the through hole. The clearance hole 111 has an elongated waist shape, with its longitudinal direction aligned with the movement direction of the locking block 11. One side of the clearance hole 111 is formed with a clearance slope 112.

In the present invention, two open slots 101 may be formed, positioned along the same diameter of the connecting sleeve 1. The positioning groove 102 may be located below one of the open slots 101. The coordinated configuration of the two open slots 101 enables the locking block 11 to reciprocate between them, allowing adjustment of the relative position between the center of the locking block 11 and the center of the connecting sleeve 1.

One side of the locking block 11 is provided with an extension section 113 that protrudes outward from the connecting boss 10. The extension section 113 extends at an angle toward the locking snap ring 12, and a certain clearance is maintained between the inner wall of the extension section 113 and the outer wall of the connecting sleeve 1. Two positioning lugs 114 are symmetrically formed on the inner wall of the extension section 113. The length direction of the positioning lugs 114 is aligned with the length direction of the extension section 113, maintaining a defined spacing between the two positioning lugs 114 in the width direction of the extension section 113. A first placement groove 115 is formed between the two positioning lugs 114 on the extension section 113. A first guide post 131 is disposed inside the first placement groove 115, with a certain clearance between its outer surface and the groove wall. The first guide post 131 is taller than the inner surface of the extension section 113. A return spring 14 is sleeved around the outer surface of the first guide post 131 in the first placement groove 115. One end of the return spring 14 abuts the bottom of the first placement groove 115, and the other end extends outward toward the connecting sleeve 1. This design not only connects the return spring 14 to the extension section 113 but also effectively prevents displacement of the return spring 14 on the extension section 113. At the position on the outer wall of the connecting sleeve 1 corresponding to the open through-slot 120, a second placement groove 116 is formed. A second guide post 132 is disposed inside the second placement groove 116, with a defined clearance between its outer surface of the second guide post 132 and the groove wall of the second placement groove 116. The second guide post 132 is taller than the outer surface of the connecting sleeve 1. The extended end of the return spring 14 is sleeved onto the second guide post 132 and abuts the bottom of the second placement groove 116. This arrangement not only connects the return spring 14 to the connecting sleeve 1 but also effectively prevents displacement of the return spring 14 on the connecting sleeve 1.

Meanwhile, a positioning protrusion 121 is provided on one side of the locking snap ring 12, at a position corresponding to the positioning groove 102. The positioning protrusion 121 engages with the positioning groove 102 in a snap-fit manner. An open through-slot 120 is formed on the opposite side of the locking snap ring 12. At the slot opening of the open through-slot 120, at positions corresponding to the positioning lugs 114, stop protrusions 122 are provided in a matched configuration. The axial direction of each stop protrusion 122 aligns with the longitudinal direction of the open through-slot 120, and each stop protrusion 122 protrudes inward from the inner wall of the locking snap ring 12. The inner wall of each stop protrusion 122 is vertically formed with a V-shaped through-slot 124 that penetrates the inner wall of the locking snap ring 12. One surface of the V-shaped through-slot 124 corresponds to the inner surface of the connecting sleeve 1, while the other surface corresponds to the side of the stop protrusion 122 opposite the open through-slot 120. The outer side wall of the corresponding stop protrusion 122 fits tightly against the outer side wall of the positioning lug 114, such that the end of the locking snap ring 12 closest to the connecting boss 10 is clamped between the inner wall of the extension section 113 and the outer wall of the connecting sleeve 1. In this state, the extension section 113 is restricted and cannot be pressed, meaning that pressing the extension section 113 cannot move the locking block 11, and the position of the locking block 11 is effectively locked. An opening is also formed on the outer wall of the locking snap ring 12, within which a tab 123 is integrally formed. Between the left and right sides of the tab 123 and the wall of the opening, first strip grooves 141 are formed. A second strip groove 142 is formed between the non-connected end of the tab 123 and the wall of the opening. The second strip groove 142 communicates at both ends with the two first strip grooves 141. A limiting bump 17 is formed on the inner wall of the tab 123, located at the non-connected end of the tab 123. The end surfaces of both the limiting bump 17 and the corresponding end faces on the connecting sleeve 1 are sloped, making the side profile of the limiting bump 17 triangular or isosceles trapezoidal. A first protrusion 143 is formed on the outer wall of the connecting sleeve 1, in close contact with the inner wall of the locking snap ring 12. A second protrusion 144 is provided at a position on the outer wall of the connecting sleeve 1 corresponding to the second strip groove 142. The end surfaces of the second protrusion 144 are also sloped on both ends, forming a triangular or isosceles trapezoidal profile. The lower end surface of the second protrusion 144 fits tightly against the upper end surface of the limiting bump 17. At positions on the connecting sleeve 1 corresponding to the stop protrusions 122, third protrusions 145 are provided. These third protrusions 145 extend into the V-shaped through-slots 124 to provide restriction. Multiple third protrusions 145 engage with the two V-shaped through-slots 124 respectively, thereby preventing the locking snap ring 12 from rotating or shifting on the connecting sleeve 1.

In the present invention, multiple tabs 123 may be provided, spaced circumferentially along the locking snap ring 12. When multiple tabs 123 are used, each tab 123 may be provided with a corresponding limiting bump 17. In this case, the second protrusions 144 formed on the inner wall of the connecting sleeve 1, corresponding to the limiting bumps 17, are also configured as multiple protrusions. To further support the locking snap ring 12, the first protrusions 143 on the outer wall of the connecting sleeve 1 may also be configured as multiple elements. These multiple first protrusions 143 can be arranged in several groups, with each group comprising multiple first protrusions 143 spaced apart along the longitudinal direction of the connecting sleeve 1. The groups themselves are spaced apart in the circumferential direction of the connecting sleeve 1. In the present invention, the height of the first protrusion 143, the second protrusion 144, and the third protrusion 145 protruding from the connecting sleeve 1 may be equal. The third protrusions 145, which respectively engage with the two V-shaped through-slots 124, may consist of just two elements-one for each slot 124—or may be arranged in two groups. Within each group, the third protrusions 145 are spaced along the longitudinal direction of the connecting sleeve 1.

The upper housing assembly includes a male plug sleeve 4, which has a placement hole 401 formed axially through its body. An orientation boss 41 is formed on one end of the outer surface of the male plug sleeve 4, while a limiting boss 40 is formed on the other end. The diameter of the limiting boss 40 is adapted to the diameter of the opening of the connecting sleeve 1, enabling the limiting boss 40 to be inserted into the connecting sleeve 1. The side of the limiting boss 40 facing the lower housing assembly is configured with a conical surface that corresponds to the clearance slope 112 formed on the locking block 11. During insertion of the male plug sleeve 4 into the connecting sleeve 1, this conical surface cooperates with the clearance slope 112 to push the locking block 11, ensuring that the center of the clearance hole 111 aligns with the center of the connecting sleeve 1. A limiting groove 42 is formed on the male plug sleeve 4 at a position between the orientation boss 41 and the limiting boss 40. The width of the limiting groove 42 is greater than the thickness of the locking block 11, allowing the locking block 11 to snap into the limiting groove 42. A first compression spring 61 is arranged within the placement hole 401. A retaining ring 402 is fixed at the end of the placement hole 401 farthest from the connecting sleeve 1. One end of the first compression spring 61 is fixed to the retaining ring 402 in the placement hole 401, while the other end is fixed to the upper valve core 2. The first sealing ring 20 mounted on the upper valve core 2 forms a sealing fit with the inner wall of the placement hole 401. During installation, the male plug sleeve 4 is inserted into the connecting sleeve 1 and passes through the locking block 11 via the clearance hole 111. When the male plug sleeve 4 is fully inserted into and communicates with the connecting sleeve 1, the limiting groove 42 aligns with the locking block 11. Upon moving the locking block 11 into place, it snaps into the limiting groove 42, with the end face of the limiting boss 40 adjacent to the limiting groove 42 abutting the lower end face of the locking block 11 to provide axial retention. This effectively locks the male plug sleeve 4 in place.

A transition slope 21 is formed around the outer wall of the upper valve core 2. This transition slope 21 gradually expands outward in diameter as it extends away from the connecting sleeve 1. Multiple such transition slopes 21 are spaced circumferentially around the upper valve core 2.

On the inner wall of the placement hole 401, at positions corresponding to the transition slopes 21, limiting slopes 403 are formed. These limiting slopes 403 closely fit against the transition slopes 21, effectively preventing the upper valve core 2 from detaching from the male plug sleeve 4. When the first compression spring 61 is not under pressure, the end face of the non-connecting end of the upper valve core 2 is flush with the opening end face of the placement hole 401—i.e., it is level with the insertion end of the male plug sleeve 4.

The lower housing assembly further includes a female plug sleeve 7, which is threadedly connected to the connecting sleeve 1. A stepped hole 15 is formed inside the connecting sleeve 1, with the diameter of the end farther from the upper housing assembly being larger than the end closer to it. The end of the push rod 50 farthest from the lower valve core 5 is fixed within the female plug sleeve 7, and the inserted end of the push rod 50 is located within the small-diameter end of the stepped hole 15. The interior of the lower valve core 5 is provided with an orientation hole 53, and the inserted end of the push rod 50 is sleeved within this orientation hole 53. This inserted end of the push rod 50 refers to the end of the push rod 50 farthest from the female plug sleeve 7. The inserted end of the push rod 50 and the orientation hole 53 form a sealed fit. At the position within the female plug sleeve 7 corresponding to the communication interface with the connecting sleeve 1, a mounting groove 71 is provided. The end of the push rod 50 farthest from the lower valve core 5 is connected to a mounting ring 54. The mounting ring 54 has a through-hole allowing fluid communication between the female plug sleeve 7 and the connecting sleeve 1. The mounting ring 54 is sleeved and fixed within the mounting groove 71 and is pressed and secured by the end of the connecting sleeve 1 opposite the upper housing assembly. A second compression spring 62 is sleeved around the outer surface of the push rod 50. A connecting lug 52 is circumferentially formed near the end of the lower valve core 5 adjacent to the female plug sleeve 7. One end of the second compression spring 62 is sleeved onto the lower valve core 5 and abuts the lower end face of the connecting lug 52. The other end of the second compression spring 62 abuts the mounting ring 54. A second sealing ring 51 is embedded in the outer wall of the inserted end of the push rod 50 and fits snugly against the inner wall of the orientation hole 53. When the inserted end of the push rod 50 is located within the lower valve core 5, it blocks the orientation hole 53, thereby sealing it.

A transition hole 16 is formed between the through-hole in the connecting boss 10 and the stepped hole 15. A sleeve 3 is sleeved around the outer side of the second compression spring 62, located at the larger-diameter end of the stepped hole 15. The outer wall of the sleeve 3 fits with the inner wall of the connecting sleeve 1, while the inner wall of the sleeve 3 fits with the connecting lug 52 on the lower valve core 5. The inserted end of the sleeve 3—i.e., the end closest to the connecting boss 10—is arranged such that between the bottom of the stepped hole 15 and the end face of the inserted sleeve 3, an upper sealing ring 63, an isolation ring 60, and a lower sealing ring 64 are sequentially stacked. The upper end face of the upper sealing ring 63 abuts the bottom of the stepped hole 15, and the lower end face of the lower sealing ring 64 abuts the end face of the inserted end of the sleeve 3. When the second compression spring 62 is not compressed, the isolation ring 60 is sleeved around the outer side of the lower valve core 5. The end of the sleeve 3 farthest from the connecting boss 10 is the outer end, and its outer end face abuts the inner wall of the mounting ring 54.

The stepped surface of the stepped hole 15 is configured as an inclined structure that tapers from narrow at the top to wide at the bottom—that is, the large-diameter end and the small-diameter end of the stepped hole 15 are connected via a sloped transition. A first positioning slope 171 is formed on the outer wall of the sleeve 3 at a position corresponding to the stepped surface of the stepped hole 15. This ensures the stable installation of the sleeve 3 within the large-diameter end of the stepped hole 15 and prevents any displacement of the sleeve 3 within that section. A second positioning slope 172 is formed on the inner wall of the sleeve 3, corresponding to the position of the first positioning slope 171. The second positioning slope 172 mates with the connecting lug 52 on the lower valve core 5, thereby preventing the lower valve core 5 from being pulled out from the end of the sleeve 3 closest to the connecting boss 10. This design ensures that the lower valve core 5 remains securely engaged within the connecting sleeve 1 and cannot detach. During assembly, the sleeve 3 is inserted into the stepped hole 15. The end face of the inserted portion of the sleeve 3 abuts the lower end face of the lower sealing ring 64. The first positioning slope 171 mates with and fits snugly against the stepped surface of the stepped hole 15, while the second positioning slope 172 abuts the upper end face of the connecting lug 52.

Additionally, since the side surfaces of the second protrusion 144 and the limiting bump 17 are triangular or isosceles trapezoidal in shape, beveled sections 18 are provided on both the second protrusion 144 and the limiting bump 17 to facilitate the movement and positioning of the locking snap ring 12. One of the beveled sections 18 is formed on the side of the limiting bump 17 farthest from the lower housing assembly, while the other beveled section 18 is formed on the side of the limiting bump 17 adjacent to the second strip-shaped groove 142. This design allows for easier locking and unlocking of the locking block 11 by the locking snap ring 12.

Operating Principle of the Invention

As shown in FIGS. 1 through 4, FIG. 9, and FIG. 14, before use, a tool is first used to expand the open through-slot 120 of the locking snap ring 12, temporarily increasing its inner diameter of the locking snap ring 12. The locking snap ring 12 is then sleeved from the bottom up onto the outer surface of the connecting sleeve 1. Since the locking snap ring 12 is made of nylon 66, once installation is complete, the open through-slot 120 returns to its original width due to elastic rebound. At this point, the outer wall of the first protrusion 143 fits snugly against the inner wall of the locking snap ring 12. The third protrusion 145 extends into the V-shaped through-slot 124, with the outer wall of the third protrusion 145 fitting tightly against the inner wall of the V-shaped through-slot 124. Simultaneously, the lower end of the locking snap ring 12 abuts and is restricted by the fixed boss 100, while the lower end surface of the second protrusion 144 engages with the upper end surface of the limiting bump 17. This configuration also ensures that the second placement groove 116 is exposed at the position of the open through-slot 120.

Next, the locking block 11 is inserted into the through-hole of the connecting boss 10 via the open slot 101, ensuring that the outer surface of the slot 101 opening aligns flush with the outer side wall of the locking block 11. The center of the clearance hole 111 on the locking block 11 is aligned with the center of the connecting sleeve 1. At the same time, one end of the return spring 14 abuts the bottom of the first placement groove 115, while the other end abuts the bottom of the second placement groove 116. In this way, the locking block 11 is movably mounted on the connecting sleeve 1.

Additionally, in the male plug sleeve 4, one end of the first compression spring 61 is fixed to the retaining ring 402, while the other end is fixed to the upper valve core 2. A first sealing ring 20 is embedded on the outer wall of the upper valve core 2, and the outer wall of the sealing ring 20 fits tightly against the inner wall of the placement hole 401, allowing the upper valve core 2 to seal the opening of the placement hole 401. At the same time, the limiting slope 403 fits against the transition slope 21, and the end face of the non-connecting end of the upper valve core 2 is flush with the opening end face of the placement hole 401.

Subsequently, as shown in FIGS. 1, 2, and 5 through 11, the upper sealing ring 63, the isolation ring 60, and the lower sealing ring 64 are sequentially placed into the stepped hole 15. The outer side walls of the upper and lower sealing rings 63 and 64 are positioned against the inner wall at the small-diameter end of the stepped hole 15. Then, the sleeve 3 is inserted, with the upper end face of the upper sealing ring 63 abutting the bottom of the stepped hole 15, and the lower end face of the lower sealing ring 64 abutting the end face of the inserted portion of the sleeve 3. The lower valve core 5 is then inserted into the sleeve 3. The end of the lower valve core 5 near the connecting boss 10 extends out from the sleeve 3 and is inserted through the isolation ring 60 and the lower sealing ring 64. Next, the second compression spring 62 is placed in position.

After that, the mounting ring 54 on the push rod 50 is sleeved and fixed into the mounting groove 71. The push rod 50 is placed vertically, and the second compression spring 62 is sleeved onto the push rod 50. Then, the female plug sleeve 7 is connected and sleeved onto the connecting sleeve 1. One end of the second compression spring 62 abuts the lower end face of the connecting lug 52, while the other end abuts the inner wall of the mounting ring 54. At the same time, the outer end face of the sleeve 3 abuts the inner wall of the mounting ring 54. At this point, the push rod 50 extends into the orientation hole 53 under the action of the second compression spring 62, and the outer wall of the second sealing ring 51 fits tightly against the inner wall of the orientation hole 53. Meanwhile, the second positioning slope 172 abuts the upper end face of the connecting lug 52, and the second sealing ring 51 maintains sealing contact with the inner wall of the orientation hole 53.

During use, as shown in FIGS. 1, 2, and 12 through 14, the male plug sleeve 4 is inserted into the connecting boss 10, with its inserted end passing through the clearance hole 111 and entering the connecting sleeve 1. As the male plug sleeve 4 continues to advance, the lower end face of the limiting boss 40 first presses against the clearance slope 112 at the mouth of the clearance hole 111, thereby forcing the locking block 11 to move out of the open slot 101 under pressure. At this point, the center of the clearance hole 111 is aligned with the central axis of the connecting sleeve 1. As insertion continues, the male plug sleeve 4 pushes the lower valve core 5, compressing the second compression spring 62. Simultaneously, the push rod 50, fixed inside the female plug sleeve 7, moves upward relative to the lower housing, pushing against the upper valve core 2. As the male plug sleeve 4 advances, the push rod 50 exits the orientation hole 53 and enters the placement hole 401, where it pushes the upper valve core 2 upward, compressing the first compression spring 61. Once the limiting boss 40 has passed the clearance slope 112, the elastic force of the return spring 14 causes the locking block 11 to return to its original position. The center of the clearance hole 111 then shifts away from the central axis of the connecting sleeve 1. The portion of the locking block 11 corresponding to the clearance slope 112 now enters the limiting groove 42, and the upper end face of the limiting boss 40 abuts the lower end face of the locking block 11, thereby achieving axial locking of the male plug sleeve 4 by the locking block 11. At the same time, the inserted end face of the male plug sleeve 4 abuts the upper end face of the lower valve core 5, and the upper end face of the push rod 50 abuts the lower end face of the upper valve core 2.

Next, the locking snap ring 12 is pushed toward the connecting boss 10. The third protrusion 145 slides within the V-shaped through-slot 124. The limiting bump 17 slides along the beveled section 18 to reach the top of the second protrusion 144. The second protrusion 144 enters the second strip groove 142 and abuts the lower end face of the limiting bump 17. Meanwhile, the positioning lug 121 enters the positioning groove 102, and the outer wall of the stop lug 122 fits snugly against the outer wall of the positioning lug 114. This securely fixes the extension section 111 between the locking snap ring and the connecting sleeve 1, preventing it from being pressed under external force and thus avoiding unintended unlocking of the male plug sleeve 4. At this point, the placement hole 401 is in communication with the orientation hole 53, allowing fluid to flow freely. Since the lower end face of the male plug sleeve 4 remains in contact with the upper end face of the lower valve core 5 throughout the insertion process, no fluid leakage occurs during connection.

During disassembly, the locking snap ring 12 is pulled downward toward the lower housing assembly. The third protrusion 145 slides along the V-shaped through-slot 124, and the limiting bump 17 moves along the beveled section 18 to the bottom end of the second protrusion 144. The upper end face of the second protrusion 144 abuts the lower end face of the limiting bump 17. The limiting bump 17 is now located below the second protrusion 144. The positioning protrusion 121 exits the positioning groove 102, and the stop protrusion 122 disengages from the positioning lug 114, thereby releasing the constraint on the extension section 111. The locking snap ring 12 is then restricted in its downward movement by the fixed boss 100. With the third protrusions 145 still engaged in the V-shaped through-slots 124, the locking snap ring 12 is prevented from rotating around the outer surface of the connecting sleeve 1, allowing for precise directional adjustment and easy locking/unlocking operations. Next, the extension section 113 is pressed, compressing the return spring 14. The extension section 113 pushes the locking block 11 such that the center of the clearance hole 111 aligns with the central axis of the connecting sleeve 1. The limiting boss 40 is now fully exposed at the clearance hole 111. Then, the connecting sleeve 1 is gradually released, allowing the male plug sleeve 4 to sequentially exit the connecting sleeve 1, the clearance hole 111, and the connecting boss 10. Meanwhile, the push rod 50 gradually withdraws from the placement hole 401. Under the elastic force of the second compression spring 62, the lower valve core 5 is pushed upward and ejected from the sleeve 3. At the same time, the first compression spring 61 drives the upper valve core 2 to press against and follow the movement of the push rod 50, gradually moving toward the insertion end of the male plug sleeve 4. As the lower valve core 5 moves upward, the second sealing ring 51 returns into the orientation hole 53, with its outer wall tightly fitting against the inner wall of the orientation hole 53. Simultaneously, the outer wall of the first sealing ring 20 fits snugly against the inner wall of the placement hole 401. Throughout the entire process, the upper valve core 2 remains in contact with the push rod 50, ensuring continuous sealing and no leakage.

Due to the fit between the transition slope 21 and the limiting slope 403, the upper valve core 2 is effectively restricted and prevented from protruding from the placement hole 401. Both the first sealing ring 20 and the second sealing ring 51 are configured as internal sealing structures, ensuring excellent sealing stability. As a result, no residual fluid or leakage occurs when the upper valve core 2 disengages from the push rod 50.

Figure 7:
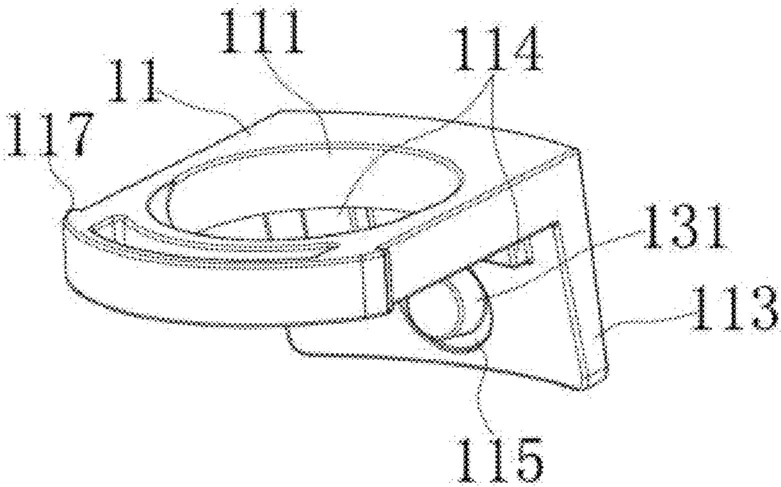
FIG. 7 is a schematic view of the structure of the locking block in Embodiment 1.
Figure 8:
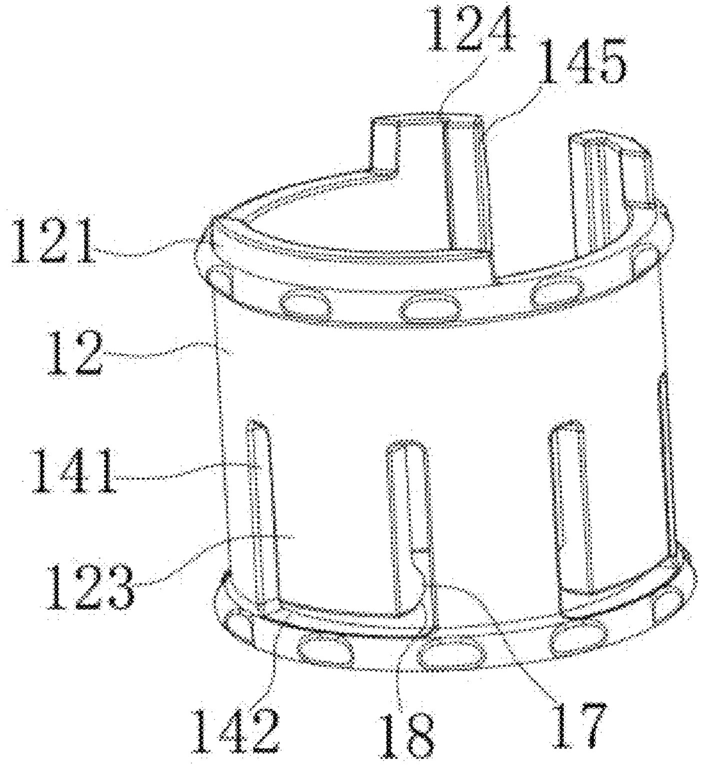
FIG. 8 is a schematic view of the structure of the locking snap ring in Embodiment 1.
Figure 9:
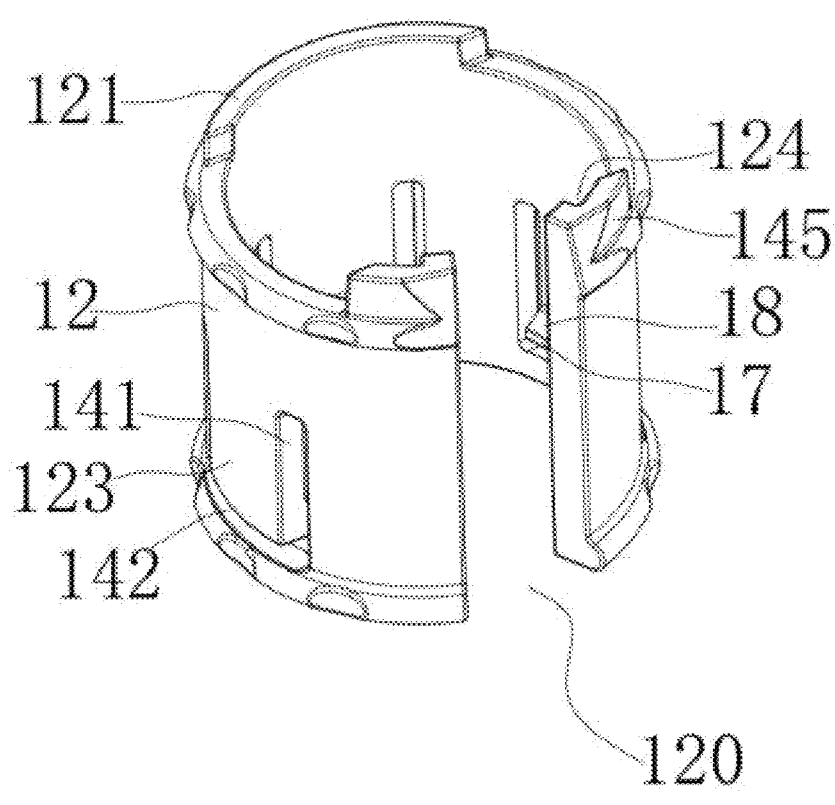
FIG. 9 is a schematic view of the structure of the open through-slot and the stop protrusion in Embodiment 1.
Figure 10:
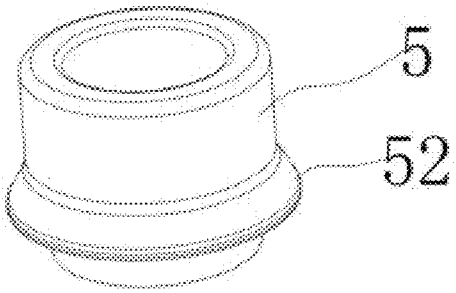
FIG. 10 is a schematic view of the structure of the lower valve core in Embodiment 1.
Figure 11:
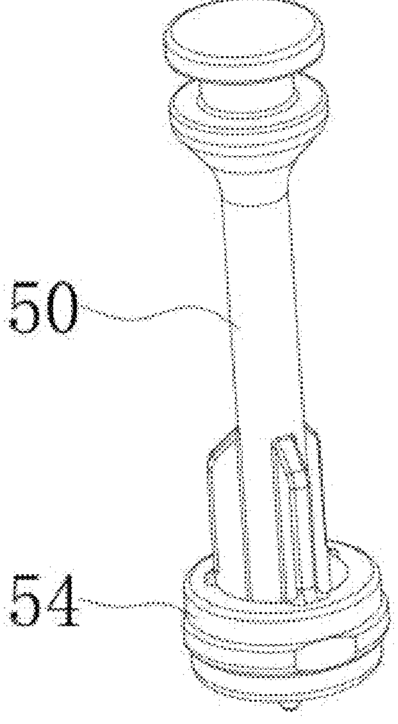
FIG. 11 is a perspective view of the installation ring and push rod in Embodiment 1.
Figure 12:
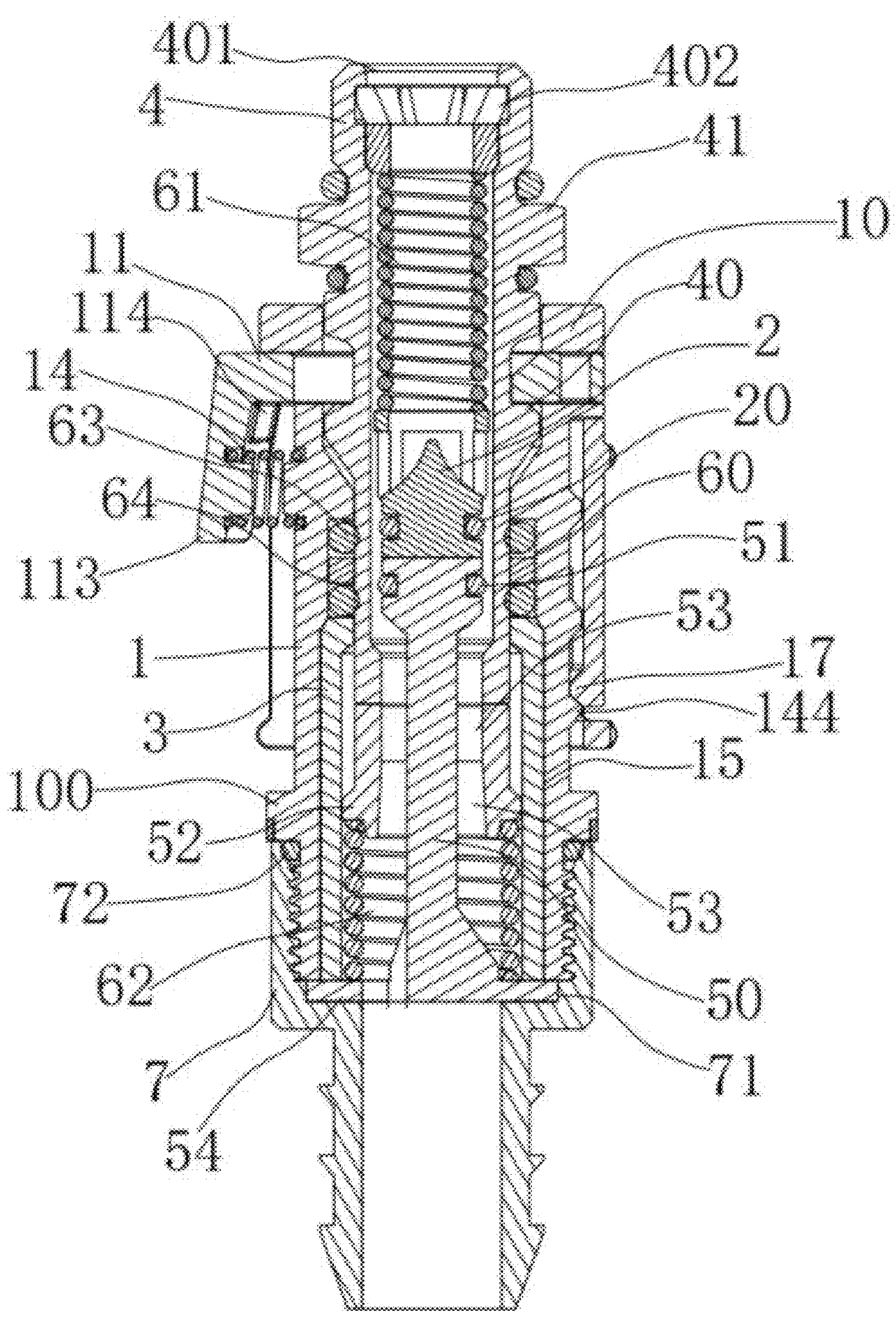
FIG. 12 is a schematic diagram of the operating state of Embodiment 1.
Figure 13:
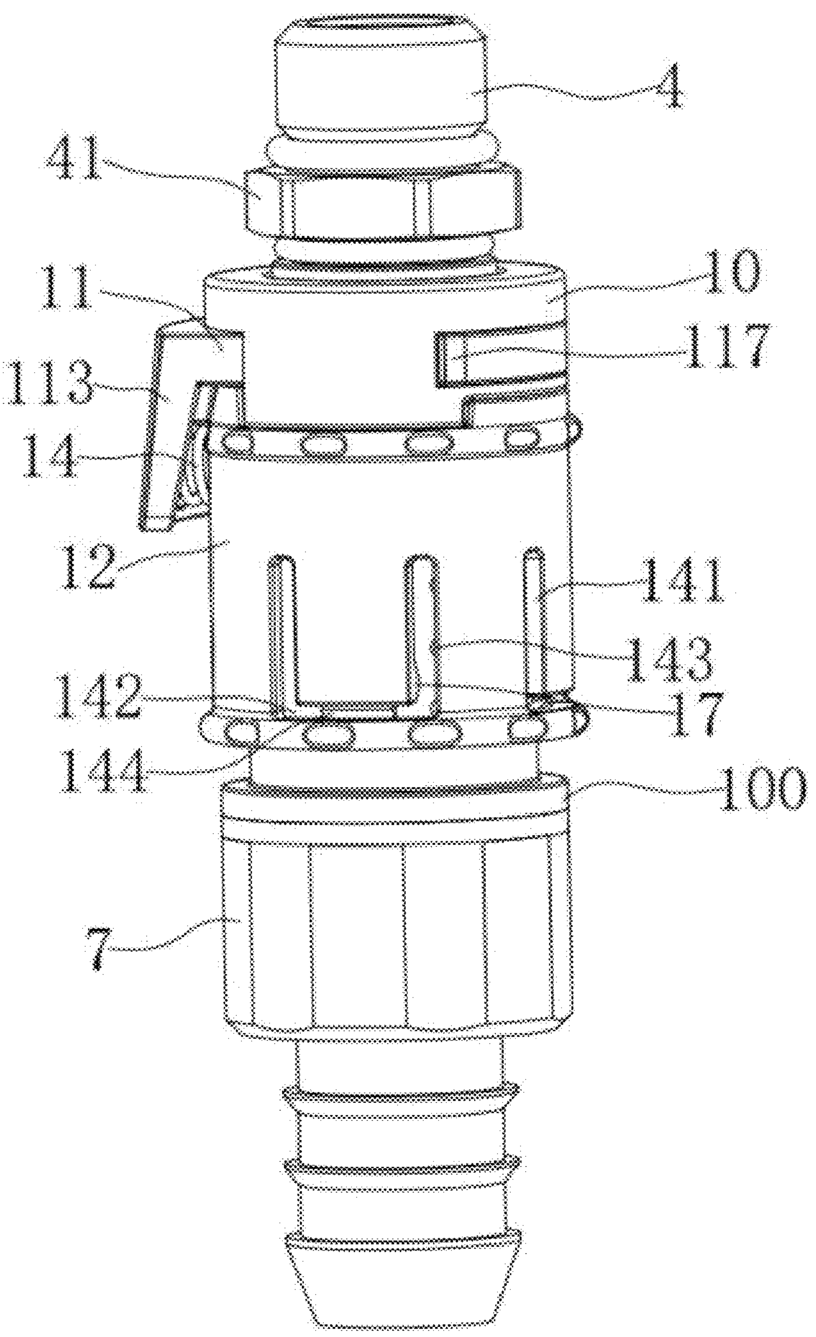
FIG. 13 is a perspective view of the assembled structure of Embodiment 1.
Figure 14:
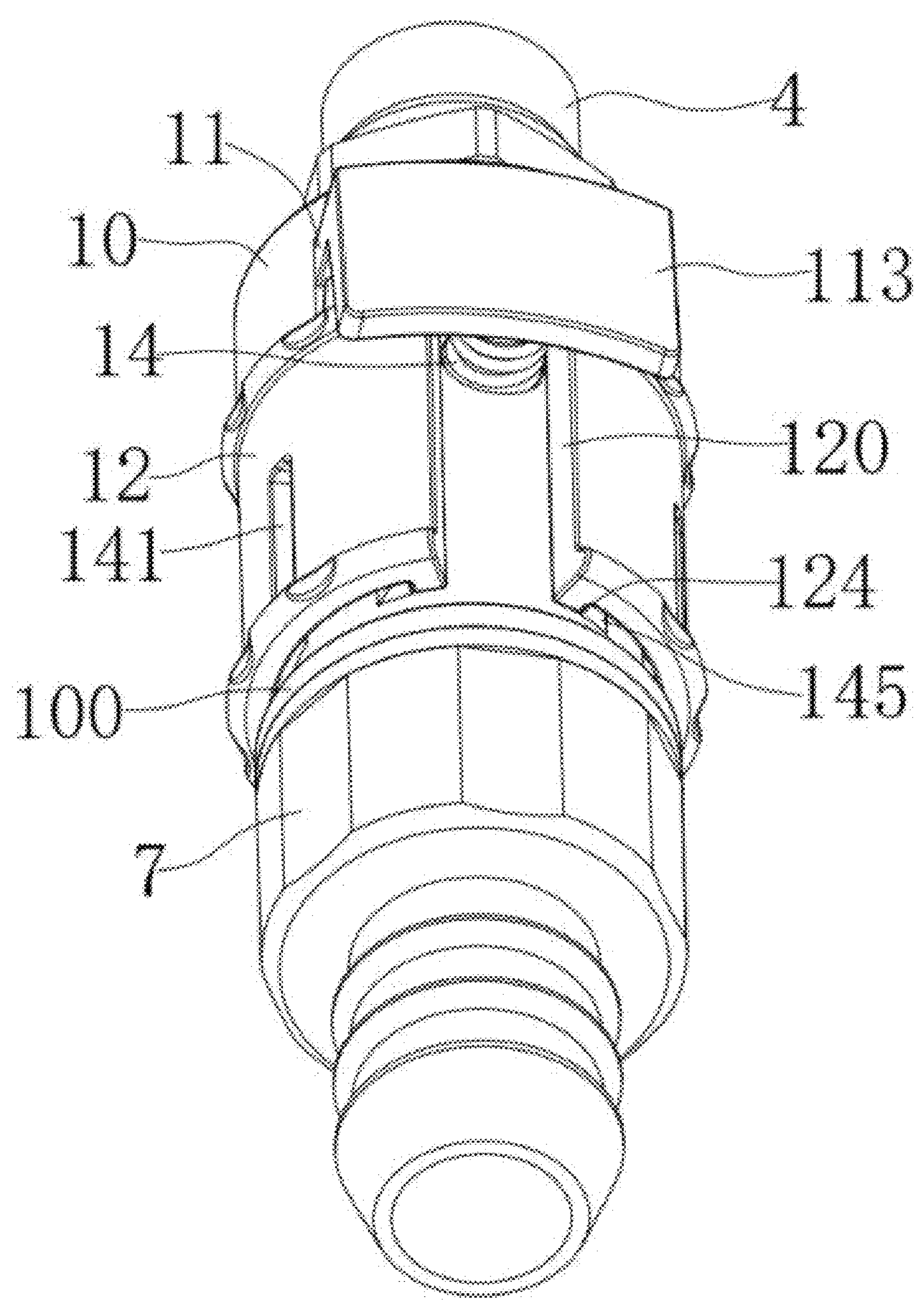
FIG. 14 is a schematic view of the installation structure of the third protrusion and the V-shaped through-slot in Embodiment 1.
Figure 15:
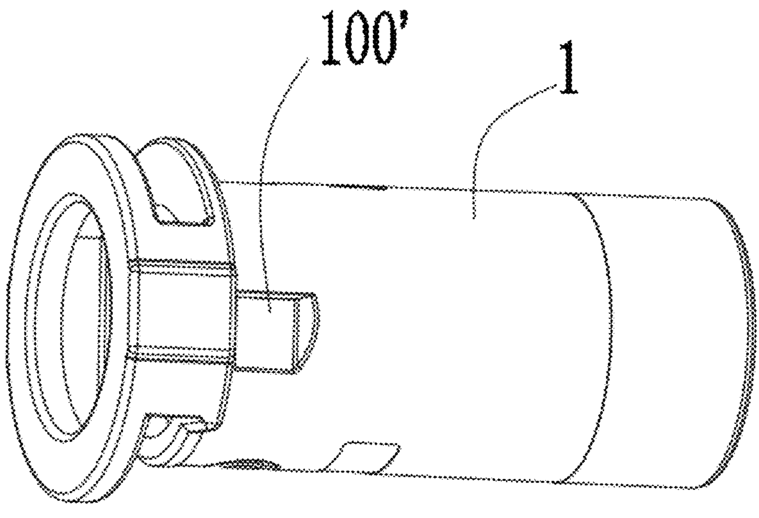
FIG. 15 is a structural view of the connecting sleeve in Embodiment 2.
Figure 16:
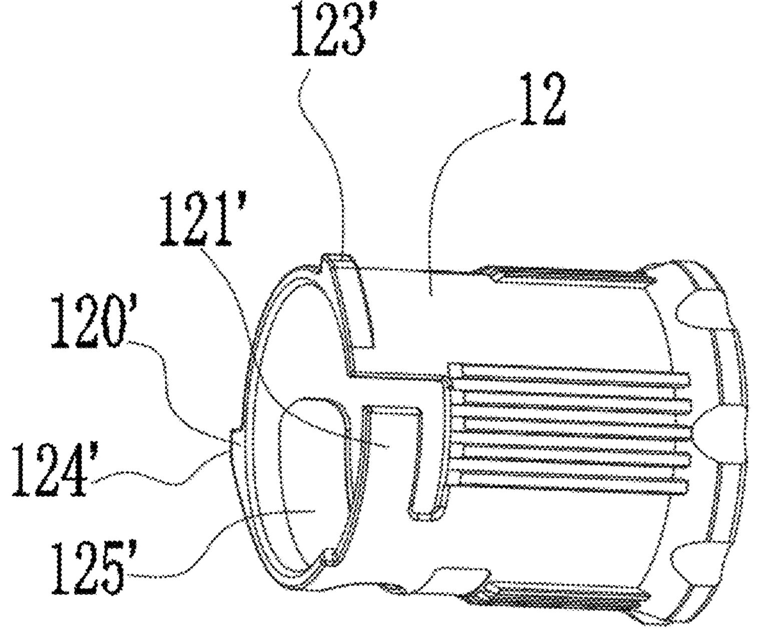
FIG. 16 is a structural view of the locking snap ring in Embodiment 2.

It should be noted, as illustrated in FIGS. 7 and 13, that during the usage process described above, to further prevent the locking block 11 from detaching, two integrated anti-return protrusions 117 are symmetrically formed on the left and right sides of the locking block 11. These two anti-return protrusions 117 abut the corresponding groove walls at the ends of the open slot 101 to provide axial retention. Additionally, to facilitate proper installation of the anti-return protrusions 117, the outer walls of the protrusions are adapted with an arc-shaped surface, and the locking block 11 is made of nylon 66 material, which allows for elastic deformation under pressure during installation.

To prevent fluid leakage at the female plug sleeve 7, a third sealing ring 72 is embedded at the root of the threaded segment of the connecting sleeve 1. When the female plug sleeve 7 is connected and threaded onto the connecting sleeve 1, the end face of its threaded portion abuts the corresponding end face of the fixed boss 100, and the inner wall of the threaded end tightly fits against the outer wall of the third sealing ring 72, ensuring a secure and sealed connection.

Since the push rod 50 comes into contact with fluid during operation and is typically integrated with the female plug sleeve 7 via injection molding, the commonly used nylon 66 material, known for its high water absorption, would cause the push rod 50 to swell after water absorption, leading to motion interference and reduced service life. Therefore, in this embodiment, the push rod 50 and the female plug sleeve 7 are manufactured separately. The push rod 50 is made from PPS (Polyphenylene sulfide), a material with low water absorption. This not only simplifies the production structure of the product but also ensures the long-term durability of the push rod 50, all without increasing assembly complexity.

Furthermore, the number of first protrusions 143, second protrusions 144, and third protrusions 145 shown in the figures of this embodiment is not fixed or exhaustive. The actual quantity should be determined according to the specific product specifications and should be evenly distributed wherever possible.

Embodiment 2

The difference between Embodiment 2 and Embodiment 1 lies in the locking mechanism between the locking snap ring 12 and the locking block 11, as well as the removal of the positioning groove 102 originally formed on the connecting boss 10. The structure of the locking snap ring 12 is redesigned accordingly. Specifically, as shown in FIGS. 15 to 18, the locking snap ring 12 is configured as a sleeve-like structure and is sleeved onto the connecting sleeve 1. The locking snap ring 12 and the connecting sleeve 1 are fitted with a clearance fit, allowing the locking snap ring 12 to rotate freely on the connecting sleeve 1. The outer wall of the locking snap ring 12 is further provided with a stop protrusion 120'. The axial position of the stop protrusion 120' corresponds to the extension section 113. By rotating the locking snap ring 12, the stop protrusion 120' can either enter the space between the inner wall of the extension section 113 and the outer wall of the locking snap ring 12, or be offset from the extension section 113 entirely. When the stop protrusion 120' is rotated into the space between the extension section 113 and the outer wall of the locking snap ring 12, it presses tightly against the extension section 113, making it impossible to press the extension section 113. This prevents unintended unlocking of the upper housing assembly by the locking block 11 due to accidental contact with the extension section 113 and ensures that the locking block 11 remains securely engaged with the upper housing assembly. Conversely, when the stop protrusion 120' is rotated away from alignment with the extension section 113, it no longer restricts the extension section 113. In this state, the extension section 113 can be pressed as usual, allowing the locking block 11 to be moved and thereby enabling normal unlocking between the upper housing assembly and the connecting sleeve 1.

To prevent the locking snap ring 12 from rotating unintentionally, such as due to vibration, after the stop protrusion 120' has been rotated into the space between the extension section 113 and the locking snap ring 12, an anti-rotation structure is implemented between the locking snap ring 12 and the connecting sleeve 1. This anti-rotation structure ensures that once the stop protrusion 120' is in place between the extension section 113 and the locking snap ring 12, the locking snap ring 12 remains fixed and continues to perform its locking function reliably on the locking block 11, thereby maintaining the locking effectiveness of the locking block 11.

In the present invention, the anti-rotation structure includes an elastic tab 121' formed on the locking snap ring 12. The elastic tab 121' is integrally formed with the locking snap ring 12 and can swing slightly inward or outward under external force. Specifically, an L-shaped slot may be formed at the end of the locking snap ring 12 near the locking block 11. One end of the L-shaped slot extends axially along the locking snap ring 12 and penetrates the end face closest to the locking block 11, while the other end extends circumferentially along the outer wall of the locking snap ring 12. In this configuration, one side of the elastic tab 121' lies flush with the end face of the locking snap ring 12 on the side adjacent to the locking block 11. Alternatively, a U-shaped slot may be formed at the one end of the locking snap ring 12 close to the locking block 11. In this arrangement, the two ends of the U-shaped slot extend circumferentially along the locking snap ring 12, while the middle section of the U-shaped slot extends in the axial direction of the locking snap ring 12. The elastic tab 121' is connected to the body of the locking snap ring 12 on one side, while the other three sides of the elastic tab 121' are separated from the locking snap ring 12 by the U-shaped slot, creating a gap that allows the tab to flex freely. Regardless of how the elastic tab 121' is formed on the locking snap ring 12, only one side of the elastic tab 121' is connected to the locking snap ring 12. This connected side is referred to as the connecting end of the elastic tab 121', while the opposite side of the elastic tab 121', farthest from the connecting end of the elastic tab 121', is referred to as the extension end of the elastic tab 121'.

A protrusion is also provided on the inner wall of the elastic tab 121', positioned near the extension end of the elastic tab 121'. A rib 100' is formed on the outer wall of the connecting sleeve 1. During the rotation of the locking snap ring 12, the stop protrusion 120' on the locking snap ring 12 gradually enters the space between the locking snap ring 12 and the extension section 113. The protrusion on the elastic tab 121' gradually approaches the rib 100'. When the protrusion contacts the rib 100', continued rotation of the locking snap ring 12 causes the protrusion on the elastic tab 121' to be pressed by the rib 100', making the extension end of the elastic tab 121' deflect outward from the locking snap ring 12. As the locking snap ring 12 continues to rotate, the protrusion on the elastic tab 121' crosses over the rib 100' and abuts tightly against it. After the protrusion crosses over the rib 100', the elastic tab 121' is no longer subjected to outward pressure and returns to its original position. Through the engagement between the protrusion and the rib 100', after the locking snap ring 12 is rotated into position, it cannot rotate backward without external force, thereby limiting the reverse rotation of the locking snap ring 12.

In order to allow the protrusion to smoothly cross over the rib 100' during the rotation of the locking snap ring 12, and to enhance the anti-reverse rotation effect of the locking snap ring 12, both the protrusion and the rib 100' may be configured as elongated structures, extending in the axial direction of the locking snap ring 12. The end faces of the protrusion and the rib 100' may be triangular or trapezoidal. The side of the protrusion opposite the elastic tab 121', and the side of the rib 100' opposite the connecting sleeve 12, may both be arc-shaped. Alternatively, the side opposite the elastic tab 121' and both lateral sides of the protrusion, as well as the side opposite the connecting sleeve 1 and both lateral sides of the rib 100', may adopt arc-shaped transitions, allowing the protrusion to cross over the rib 100' more smoothly.

Figure 18:
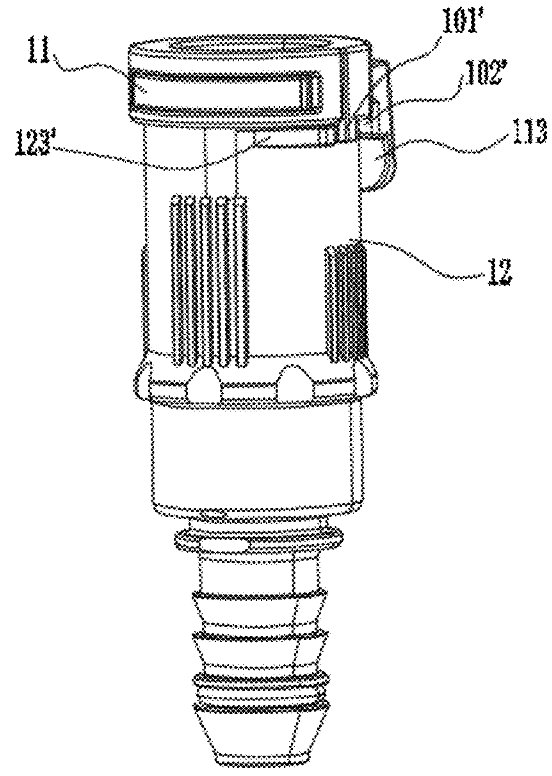
FIG. 18 is a schematic view showing the cooperation between the first and second bosses after the locking snap ring has rotated.

As shown in FIG. 18, since the engagement between the protrusion and the rib 100' can only limit the reverse rotation of the locking snap ring 12 after rotation, in order to prevent the stop protrusion 120' from being misaligned with the extension section 113 due to continued rotation of the locking snap ring 12 after the stop protrusion 120' enters the space between the locking snap ring 12 and the extension section 113, the anti-rotation structure further includes a first boss 123' formed on the outer wall of the locking snap ring 12 and a second boss 101' formed on the outer wall of the connecting sleeve 1. Taking the rotation direction of the locking snap ring 12 as the forward direction, the first boss 123' is located in front of the second boss 101'. When the locking snap ring 12 is rotated so that the stop protrusion 120' enters the space between the locking snap ring 12 and the extension section 113, the first boss 123' abuts against the second boss 101', preventing the locking snap ring 12 from continuing to rotate, thereby stopping the locking snap ring 12 from rotating after the stop protrusion 120' enters the locking snap ring 12 and the extension section 113.

In the present invention, the connecting sleeve 1 is configured as a stepped shaft. Compared with the connecting sleeve 1 in Embodiment 1, the fixed boss 100 is omitted. The locking snap ring 12 is sleeved on the smaller diameter end of the connecting sleeve 1. After the lower housing assembly is connected to the connecting sleeve 1, one end of the locking snap ring 12 fits against the step surface of the connecting sleeve 1, and the other end fits against the lower housing assembly, thereby restricting the axial movement of the locking snap ring 12 on the connecting sleeve 1. Since the fixed boss 100 is omitted from the design of the connecting sleeve 1, in order to ensure sealing between the lower housing assembly and the connecting sleeve 1, the lower housing assembly may be fixed to the connecting sleeve 1 by welding. Of course, if the structural stability of the connection between the lower housing assembly and the connecting sleeve 1 is not a concern, a threaded connection between the lower housing assembly and the connecting sleeve 1 may still be used.

In the present invention, since one end of the locking snap ring 12 is constrained by the lower housing assembly, the second boss 101' may alternatively be arranged on the lower housing assembly, provided that the locking snap ring 12 cannot continue to rotate after the stop protrusion 120' enters the space between the locking snap ring 12 and the extension section 113. In this configuration, the first boss 123' is located at the end of the locking snap ring 12 adjacent to the lower housing assembly. This design also effectively prevents the locking snap ring 12 from rotating further after reaching the locking position.

In the present invention, in order to enable the stop protrusion 120' to tightly engage with the extension section 113, a second arc surface 102' is provided on the inner wall of the extension section 113. The second arc surface 102' extends through both sidewalls of the extension section 113, and may be configured as a convex surface protruding inward from the inner wall of the extension section 113, or as a concave surface recessed into the inner wall. Correspondingly, the stop protrusion 120' is provided with a first arc surface 124' adapted to the second arc surface 102'. To facilitate the smooth entry of the stop protrusion 120' into the space between the extension section 113 and the locking snap ring 12 during rotation, the second arc surface 102' and the first arc surface 124' are configured with clearance fit. Alternatively, an arc chamfer or guide slope may be provided at both ends of the stop protrusion 120' to assist in guiding its insertion.

To prevent the return spring 14, positioned between the inner wall of the extension section 113 and the outer wall of the connecting sleeve 1, from interfering with the rotation of the locking snap ring 12, an opening 125' is provided on the locking snap ring 12 to accommodate the return spring 14. The opening 125' extends in the circumferential direction of the locking snap ring 12.

Figure 17:
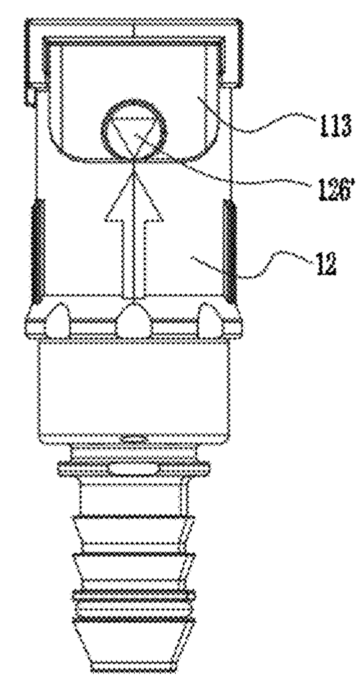
FIG. 17 is a structural view of the locking snap ring after rotation.

As shown in FIG. 17, to allow immediate observation of the locking status of the locking block, indicator marks 126' may also be provided on both the extension section 113 and the locking snap ring 12. When the locking snap ring 12 is rotated such that the stop protrusion 120' enters the space between the locking snap ring 12 and the extension section 113, the indicator mark 126' on the extension section 113 aligns with the indicator mark 126' on the locking snap ring 12. If the locking snap ring 12 has not yet been rotated into its designated position, the indicator marks 126' on the extension section 113 and the locking snap ring 12 will be misaligned. In the present invention, the indicator marks 126' may be arrows, indicator lines, or other suitable symbols.

In the present invention, to facilitate rotation of the locking snap ring 12, anti-slip patterns may also be formed on the surface of the locking snap ring 12.

In the present invention, during assembly, the locking snap ring 12 is first sleeved onto the connecting sleeve 1. The return spring 14 is then placed inside the extension section 113, and the locking block 11 is inserted into the connecting sleeve 1. Subsequently, the assembled lower housing assembly is sleeved onto the connecting sleeve 1 and fixed to it. Finally, the preassembled upper housing assembly is inserted into the connecting sleeve 1.

During use, after the locking block locks the upper housing assembly to the connecting sleeve 1, the locking snap ring 12 is rotated. During the rotation, the stop protrusion 120' gradually enters the inner side of the extension section 113. As the rotation of the locking snap ring 12 continues, when the protrusion on the elastic tab 121' comes into contact with the rib 100' on the connecting sleeve, further rotation causes the protrusion on the elastic tab 121' to be pressed by the rib 100', resulting in the extension end of the elastic tab 121' deflecting outward from the locking snap ring 12. As the locking snap ring 12 continues to rotate, the protrusion on the elastic tab 121' crosses over the rib 100' and abuts tightly against it. After crossing the rib 100', the protrusion is no longer subjected to outward pressure, and the elastic tab 121' returns to its original position. At this point, the stop protrusion 120' enters the space between the extension section 113 and the locking snap ring 12, where the first boss 123' and the second boss 101' cooperate to restrict further rotation of the locking snap ring 12, and the engagement between the protrusion and the rib 100' restricts reverse rotation of the locking snap ring 12.

What is claimed is:

1. A snap-locking connector, comprising a connecting sleeve (1) movably provided with a locking block (11), an upper housing assembly snap-fitted with the locking block (11), a locking snap ring (12) adjustably sleeved on an outer side of the connecting sleeve (1) and abutting against the locking block (11) to provide positional restriction, and a lower housing assembly detachably connected to the connecting sleeve (1);

wherein an upper valve core (2) is elastically disposed within the upper housing assembly, and a first sealing ring (20) is provided on the upper valve core (2); the lower housing assembly contains a push rod (50) and a lower valve core (5) elastically mounted, the lower valve core (5) is sleeved on an outer side wall of one side of the push rod (50); a second sealing ring (51) is arranged at a corresponding sleeving position on the push rod (50); in use, the upper housing assembly presses against the lower valve core (5), causing the push rod (50) to push the upper valve core (2) outward, thereby establishing communication between the upper housing assembly and lower housing assembly; the locking block (11) snaps into the upper housing assembly to restrict movement, and the locking snap ring (12) is adjusted along the outer side of the connecting sleeve (1) to abut and secure the locking block (11); for disassembly, the locking snap ring (12) is moved away, the locking block (11) is pressed to release a snap position, and under elastic force, the upper valve core (2) is pushed back by the push rod (50); a liquid outlet end of the upper housing assembly seals against the first sealing ring (20), while the second sealing ring (51) seals against a liquid outlet end of the lower housing assembly;

wherein one side of the connecting sleeve (1) is provided with a connecting boss (10), while an other side of the connecting sleeve (1) is provided with a fixed boss (100) that abuts against and limits a position of the locking snap ring (12); a through hole communicating with the connecting sleeve (1) is formed in the connecting boss (10), within which a locking block (11) is disposed; an open slot (101) is formed in the connecting boss (10) at a position corresponding to the locking block (11), and a positioning groove (102) is formed at an lower end of a slot opening in the connecting boss (10); the locking block (11) is provided with a clearance hole (111) that communicates with the through hole, and one side of an opening of the clearance hole (111) is provided with a clearance slope (112); one side of the locking block (11) is provided with an extension section (113) that extends out of the connecting boss (10); two positioning lugs (114) are symmetrically arranged on an inner side wall of the extension section (113); a first placement groove (115) is provided at a position between the two positioning lugs (114); a first guide post (131) is disposed within the first placement groove (115), and a return spring (14) is sleeved on an outside of the first guide post (131); one end of the return spring (14) abuts against a bottom of the first placement groove (115), and an other end of the return spring (14) extends outward to abut against a corresponding position on the connecting sleeve (1).

2. The snap-locking connector according to claim 1, wherein a positioning protrusion (121) is provided on one side of the locking snap ring (12) at a position corresponding to the positioning groove (102), and an open through-slot (120) is provided on an other side of the locking snap ring (12); at a slot opening of the open through-slot (120), at positions corresponding to the positioning lugs (114), stop protrusions (122) are respectively provided; each stop protrusion (122) has a vertically oriented "V"-shaped through-slot (124) running through an inner side wall of the locking snap ring (12); an outer side wall of the stop protrusion (122) on a corresponding end fits against an outer side wall of the positioning lug (114); an opening is further provided on an outer wall of the locking snap ring (12), and a tab (123) is integrally connected within the opening; a limiting bump (17) is formed on an inner wall of the tab (123); between left and right ends of the tab (123) and a opening wall, a first strip groove (141) is formed on each side; a second strip groove (142) is formed between a non-connected end of the tab (123) and a wall of the opening; two ends of the second strip groove (142) are respectively connected to the two first strip grooves (141); a first protrusion (143) is formed on an outer wall of the connecting sleeve (1), in close contact with the inner wall of the locking snap ring (12), and a second protrusion (144) is provided at a position corresponding to the second strip groove (142); a lower end surface of the second protrusion (144) fits against an upper end surface of the limiting bump (17); at a positions on the connecting sleeve (1) corresponding to the stop protrusions (122), third protrusions (145) are provided, which extend into the "V"-shaped through-slots (124) to limit movement, thereby preventing the locking snap ring (12) from rotating or shifting on the connecting sleeve (1).

3. The snap-locking connector according to claim 2, wherein a second placement groove (116) is formed on an outer side wall of the connecting sleeve (1) at a position corresponding to the open through-slot (120); a second guide post (132) is disposed within the second placement groove (116), and an extended end of the return spring (14) is sleeved on an outer side of the second guide post (132), with one end abutting against a bottom of the second placement groove (116).

4. The snap-locking connector according to claim 3, wherein beveled sections (18) are provided on both the second protrusion (144) and the limiting bump (17) to facilitate the displacement of the locking snap ring (12).

5. The snap-locking connector according to claim 1, wherein the upper housing assembly comprises a male plug sleeve (4), in which a placement hole (401) is axially formed through the male plug sleeve (4); one end of an outer side of the male plug sleeve (4) is provided with an orientation boss (41), and an other end is provided with a limiting boss (40); a limiting groove (42) is formed on the male plug sleeve (4) between the orientation boss (41) and the limiting boss (40); a first compression spring (61) is disposed within the placement hole (401), with one end fixedly connected to a retaining ring (402) secured inside the placement hole (401), and an other end fixedly connected to the upper valve core (2); a first sealing ring (20) is embedded on an outer wall of the upper valve core (2), and an outer wall of the first sealing ring (20) is fitted against an inner wall of the placement hole (401); during installation, the male plug sleeve (4) is inserted into the connecting sleeve (1) and passes through the locking block (11) via the clearance hole (111); an upper end surface of the limiting boss (40) abuts against a lower end surface of the locking block (11), thus enabling the locking block (11) to lock and position the male plug sleeve (4).

6. The snap-locking connector according to claim 5, wherein a transition slope (21) is formed around an outer side wall of the upper valve core (2), and a limiting slope (403) is provided on an inner wall of the placement hole (401) at a position corresponding to the transition slope (21); the limiting slope (403) is fitted against the transition slope (21), such that an end face of a non-connection end of the upper valve core (2) is flush with an end face of a corresponding opening of the placement hole (401).

7. The snap-locking connector according to claim 1, wherein the lower housing assembly further comprises a female plug sleeve (7) threadably connected to the connecting sleeve (1); a stepped hole (15) is formed inside the connecting sleeve (1), and a push rod (50) is fixed inside the female plug sleeve (7), extending into a smaller diameter end of the stepped hole (15); an inserted end of the push rod (50) is sleeved within the orientation hole (53) of the lower valve core (5); an installation groove (71) is formed inside the female plug sleeve (7) at a position corresponding to its connection with the connecting sleeve (1); an installation ring (54) is connected to one end of the push rod (50) and sleeved and fixed inside the installation groove (71); a second compression spring (62) is also sleeved around an outer side of the push rod (50); a circumferential connecting lug (52) is arranged on one side of the lower valve core (5); one end of the second compression spring (62) abuts against a lower end surface of the connecting lug (52), while an other end abuts against an inner wall of the installation ring (54); a second sealing ring (51) is embedded in an outer wall of the push rod (50), with an outer wall of the second sealing ring (51) fitted against an inner wall of the orientation hole (53).

8. The snap-locking connector according to claim 7, wherein a transition hole (16) is formed between the through hole and the stepped hole (15) to provide communication between them; a sleeve (3) is sleeved around an outer side of the second compression spring (62), extending into a larger-diameter end of the stepped hole (15); from top to bottom, an end face of the inserted end of the sleeve (3) and a bottom of the stepped hole (15) are sequentially stacked with an upper sealing ring (63), an isolation ring (60), and a lower sealing ring (64); an upper end surface of the upper sealing ring (63) abuts against the bottom of the stepped hole (15), and an lower end surface of the lower sealing ring (64) abuts against an end face of an inserted end of the sleeve (3); the isolation ring (60) is sleeved around an outer side of the lower valve core (5); an outer end surface of the sleeve (3) abuts against an inner wall of the installation ring (54).

9. The snap-locking connector according to claim 8, wherein a step surface of the stepped hole (15) has an inclined structure that is narrower at a top and wider at a bottom; a first positioning slope (171) is provided on an outer side wall of the sleeve (3) at a position corresponding to the step surface of the stepped hole (15); a second positioning slope (172) is provided on an inner side wall of the sleeve (3) at a position corresponding to the first positioning slope (171); during installation, the sleeve (3) is inserted into the stepped hole (15), with an end face of the inserted end of the sleeve (3) abutting a lower end surface of the lower sealing ring (64); the first positioning slope (171) fits against the step surface of the stepped hole (15), and the second positioning slope (172) fits against an upper end surface of the connecting lug (52).

10. The snap-locking connector according to claim 1, wherein the locking snap ring (12) is rotatable on the connecting sleeve (1) but not axially movable, and an outer wall of the locking snap ring (12) is provided with a stop protrusion (120') that can press between the extension section (113) and the locking snap ring (12).

11. The snap-locking connector according to claim 10, wherein the locking snap ring (12) and the connecting sleeve (1) are equipped with an anti-rotation structure, which prevents the locking snap ring (12) from rotating when the stop protrusion (120') is pressed between the extension section (113) and the locking snap ring (12).

12. The snap-locking connector according to claim 11, wherein the anti-rotation structure includes an elastic tab (121') provided on the locking snap ring (12), an inner wall of which has a protrusion, and the outer wall of the connecting sleeve (1) has a rib (100') adapted to the protrusion.

13. The snap-locking connector according to claim 10, wherein an inner wall of the extension section (113) has a second arc surface (102'), and the stop protrusion (122') is provided with a first arc surface (102') adapted to the second arc surface (102').

14. The snap-locking connector according to claim 10, wherein the locking snap ring (12) is further provided with an opening (125') for accommodating the return spring (14), and corresponding markings (126') are provided on both the extension section (113) and the locking snap ring (12) for alignment.

15. The snap-locking connector according to claim 11, wherein the anti-rotation structure further includes a first boss (123') on the locking snap ring (12) and a second boss (101') on the connecting sleeve (1), which tightly engage when the stop protrusion (120') is pressed between the extension section (113') and the locking snap ring (12).

* * * * *